United States Patent
Takeshita et al.

(10) Patent No.: US 9,580,652 B2
(45) Date of Patent: Feb. 28, 2017

(54) LIQUID CRYSTAL COMPOUND, LIQUID CRYSTAL COMPOSITION INCLUDING THE SAME AND LIQUID CRYSTAL DISPLAY INCLUDING THE LIQUID CRYSTAL COMPOSITION

(71) Applicant: SAMSUNG DISPLAY CO., LTD., Yongin, Gyeonggi-Do (KR)

(72) Inventors: Fusayuki Takeshita, Gyeonggi-Do (KR); Jaejin Lyu, Gyeonggi-Do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/635,078

(22) Filed: Mar. 2, 2015

(65) Prior Publication Data

US 2016/0083653 A1    Mar. 24, 2016

(30) Foreign Application Priority Data

Sep. 22, 2014  (KR) .......................... 10-2014-0126049

(51) Int. Cl.
| | |
|---|---|
| *G02F 1/1333* | (2006.01) |
| *C09K 19/30* | (2006.01) |
| *C09K 19/04* | (2006.01) |
| *C09K 19/12* | (2006.01) |

(52) U.S. Cl.
CPC ...... *C09K 19/3028* (2013.01); *C09K 19/3003* (2013.01); *C09K 19/3066* (2013.01); *C09K 2019/0444* (2013.01); *C09K 2019/0466* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3012* (2013.01); *C09K 2019/3016* (2013.01); *C09K 2019/3019* (2013.01); *C09K 2019/3021* (2013.01); *C09K 2019/3037* (2013.01)

(58) Field of Classification Search
CPC .............. G02F 1/1333; C09K 19/3028; C09K 19/3003; C09K 19/3066; C09K 2019/3009; C09K 2019/301; C09K 2019/3004; C09K 2019/3016; C09K 2019/3037; C09K 2019/0444; C09K 2019/0466; C09K 2019/122; C09K 2019/123; C09K 2019/3012; C09K 2019/3019; C09K 2019/3021

USPC ............. 252/299.01, 299.6, 299.63; 428/1.1; 568/647; 349/182

See application file for complete search history.

(56) References Cited

U.S. PATENT DOCUMENTS

| | | |
|---|---|---|
| 5,439,613 A | 8/1995 | Takeshita et al. |
| 5,571,449 A | 11/1996 | Bartmann et al. |
| 6,254,941 B1 | 7/2001 | Kondou et al. |
| 6,391,397 B1 | 5/2002 | Jones et al. |
| 6,444,278 B1 | 9/2002 | Reiffenrath et al. |
| 6,468,608 B1 * | 10/2002 | Bremer ................... C07C 25/18 252/299.63 |
| 6,558,758 B1 | 5/2003 | Yanai et al. |
| 7,169,449 B2 | 1/2007 | Nakanishi et al. |
| 2002/0084443 A1 | 7/2002 | Heckmeier et al. |
| 2010/0134751 A1 | 6/2010 | Klasen-Memmer et al. |

FOREIGN PATENT DOCUMENTS

| | | |
|---|---|---|
| JP | 06-192142 | 7/1994 |
| JP | 6-200251 | 7/1994 |
| JP | 9-124529 | 5/1997 |
| JP | 2001115161 | 4/2001 |
| JP | 2001316669 | 11/2001 |
| JP | 2009-504814 | 2/2009 |
| KR | 1020050029523 | 3/2005 |

* cited by examiner

*Primary Examiner* — Geraldina Visconti
(74) *Attorney, Agent, or Firm* — F. Chau & Associates, LLC

(57) ABSTRACT

A liquid crystal compound represented by Formula 1:

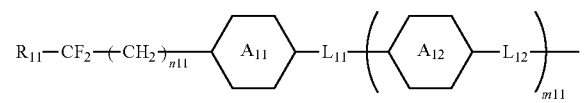

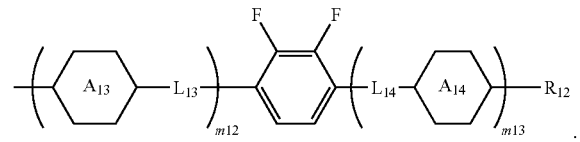

20 Claims, No Drawings

LIQUID CRYSTAL COMPOUND, LIQUID CRYSTAL COMPOSITION INCLUDING THE SAME AND LIQUID CRYSTAL DISPLAY INCLUDING THE LIQUID CRYSTAL COMPOSITION

CROSS-REFERENCE TO RELATED APPLICATION

This application claims priority under 35 U.S.C. §119 to Korean Patent Application No. 10-2014-0126049, filed on Sep. 22, 2014, in the Korean Intellectual Property Office, the disclosure of which is incorporated by reference herein in its entirety.

1. TECHNICAL FIELD

Exemplary embodiments of the present invention relate to a liquid crystal compound, a liquid crystal composition including the liquid crystal compound, and a liquid crystal display including the liquid crystal composition.

2. DISCUSSION OF RELATED ART

Liquid crystal displays are generally flat, convenient to carry and have low power consumption.

Liquid crystal displays may include two substrates with a pixel electrode or a common electrode disposed thereon, and a liquid crystal layer disposed between the two substrates. When a voltage is applied to the pixel electrode or the common electrode to generate an electric field in the liquid crystal layer, the alignment of liquid crystal molecules in the liquid crystal layer may be changed to alter the polarization of light passing through the liquid crystal layer, and consequently, an image may be displayed on the liquid crystal display.

SUMMARY

Exemplary embodiments of the present invention include a liquid crystal compound, a liquid crystal composition including the liquid crystal compound, and a liquid crystal display including the liquid crystal composition.

According to an exemplary embodiment of the present invention, there is provided a liquid crystal compound represented by Formula 1:

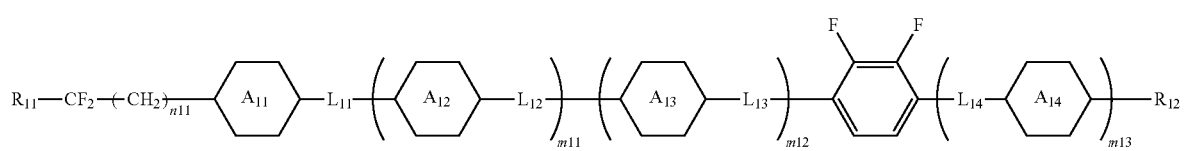

<Formula 1>

is a group represented by Formula 10-1

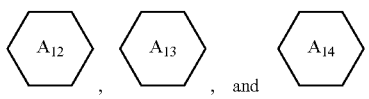

are each independently selected from groups represented by Formulae 10-1 to 10-12:

10-1

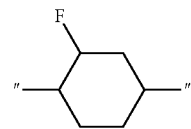

10-2

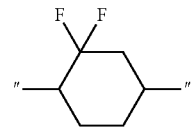

10-3

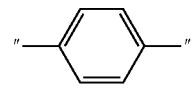

10-4

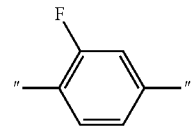

10-5

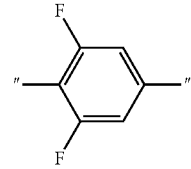

10-6

-continued

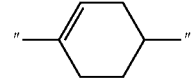

10-7

-continued

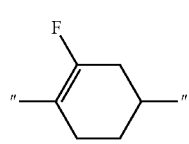
10-8

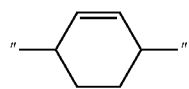
10-9

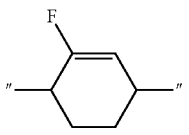
10-10

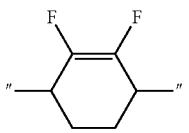
10-11

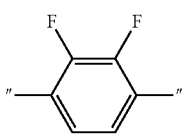
10-12

In Formulae 10-1 to 10-12, " indicates a binding site with an adjacent atom.

$L_{11}$, $L_{12}$, $L_{13}$, and $L_{14}$ are each independently selected from a single bond, —$CH_2CH_2$—, —$CH_2O$—, —$OCH_2$—, —$CF_2O$—, and —$OCF_2$.

m11, m12, and m13 are each independently selected from 0 and 1.

n11 is selected from 0, 1, 2, 3, and 4.

$R_{11}$ is selected from hydrogen and a $C_1$-$C_7$ alkyl group.

$R_{12}$ is selected from hydrogen, —F, a $C_1$-$C_5$ alkyl group, a $C_1$-$C_5$ alkoxy group, a $C_2$-$C_5$ alkenyl group, a $C_1$-$C_5$ alkyl group substituted with —F, a $C_1$-$C_5$ alkoxy group substituted with —F, and—a $C_2$-$C_5$ alkenyl group substituted with —F.

According to an exemplary embodiment of the present invention, a liquid crystal composition includes the liquid crystal compound of Formula 1.

According to an exemplary embodiment of the present invention, a liquid crystal display includes a first electrode, a second electrode, and a liquid crystal layer disposed between the first electrode and the second electrode. The liquid crystal layer includes the liquid crystal composition including the liquid crystal compound of Formula 1.

DETAILED DESCRIPTION OF THE EMBODIMENTS

The present invention will now be described more fully with reference to exemplary embodiments. Exemplary embodiments of the present invention may, however, be embodied in many different forms and should not be construed as being limited to the embodiments set forth herein.

As used herein, the singular forms "a", "an", and "the" are intended to include the plural forms as well, unless the context clearly indicates otherwise.

As used herein, when a layer, a region, or a component is referred to as being "on" or "above" another layer, region, or component, the layer, region, or component can be directly on another layer, region or component, or intervening layers, regions or components may be present.

As used herein, "Tni" denotes a liquid crystal operating temperature. A liquid crystal composition (or a liquid crystal compound) may undergo nematic to isotropic phase transition at a liquid crystal operating temperature Tni or higher. A liquid crystal composition (or a liquid crystal compound) suitable for an active matrix liquid-crystal display (AM-LCD) may have a liquid crystal operating temperature Tni of about 60° C. or higher to about 120° C. The liquid crystal composition (or a liquid crystal compound) suitable for an AMLCD may be nematic in a temperature range of about −20° C. to about 120° C.

As used herein, "Δ∈" denotes dielectric anisotropy. The expression "negative dielectric anisotropy" means that Δ∈ is less than 0.

As used herein, "Δn" denotes anisotropy in refractive index. A liquid crystal composition suitable for liquid crystal displays may have a Δn value of about 0.060 to about 0.300. For a twisted nematic (TN), vertical alignment (VA), in-plane switching (IPS), or fringe field switching (FFS) mode LCD, the product of multiplying Δn by a cell gap (d) may be in a range of about 0.20 μm to about 0.50 μm.

As used herein, "η" denotes a flow viscosity. A smaller η may be good for an AMLCD. For example, a liquid crystal composition may have a flow viscosity (q) that is larger than 0 and equal to or less than 50 cP, which may be converted into a rotational viscosity (γ1) that is larger than 0 and equal to or less than about 300 mPa·s.

As used herein, "VHR" denotes a voltage holding ratio.

According to an exemplary embodiment of the present invention, there is provided a liquid crystal compound represented by Formula 1:

<Formula 1>

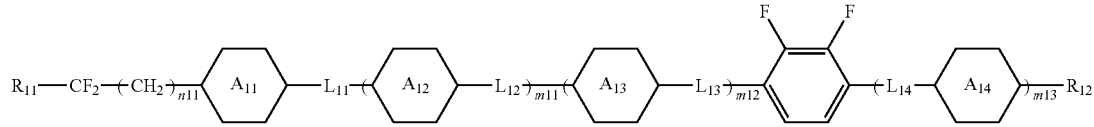

wherein, in Formula 1,

is a group represented by Formula 10-1;

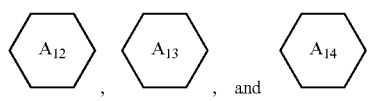

are each independently selected from groups represented by Formulae 10-1 to 10-12:

10-1

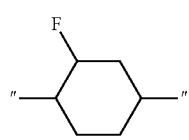
10-2

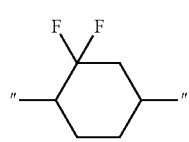
10-3

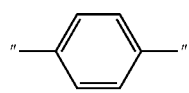
10-4

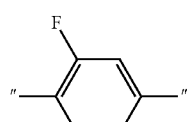
10-5

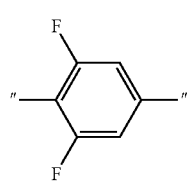
10-6

10-7

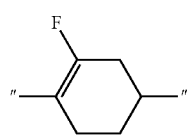
10-8

10-9

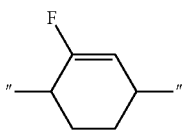
10-10

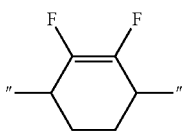
10-11

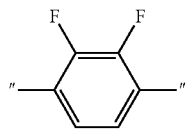
10-12 wherein, in Formulae 10-1 to 10-12, " indicates a binding site with an adjacent atom.

The groups represented by Formulae 10-2 and 10-3 may each independently include different optical isomers or one optical isomer.

For example, in Formula 1,

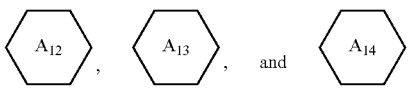

may be each independently selected from groups represented by Formulae 10-1 to 10-7 and Formulae 10-9 and 10-12, but are not limited thereto.

In an exemplary embodiment of the present invention, in Formula 1,

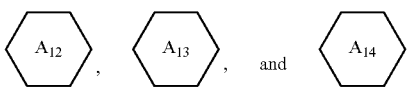

may be each independently selected from groups represented by Formulae 10-1 to 10-6 and Formula 10-12, but are not limited thereto.

In an exemplary embodiment of the present invention, in Formula 1,

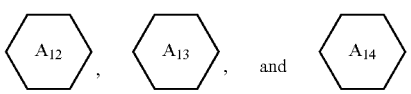

may be each independently selected from groups represented by Formula 10-1, Formulae 10-4 to 10-6, and Formula 10-12, but are not limited thereto.

In an exemplary embodiment of the present invention, in Formula 1,

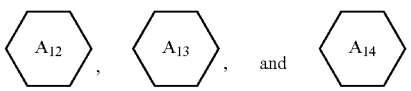

may be each independently selected from groups represented by Formulae 10-1 and 10-4, but are not limited thereto.

In Formula 1, $L_{11}$, $L_{12}$, $L_{13}$, and $L_{14}$ may be each independently be selected from a single bond, —$CH_2CH_2$—, —$CH_2O$—, —$OCH_2$—, —$CF_2O$—, and —$OCF_2$—.

In Formula 1, m11 may be selected from 0 and 1. When m11 is 0,

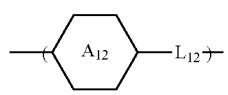

means a single bond.

In Formula 1, m12 may be selected from 0 and 1. When m12 is 0,

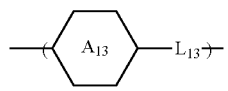

means a single bond.

In Formula 1, m13 may be selected from 0 and 1. When m13 is 0,

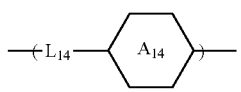

means a single bond,

In Formula 1, n11, which indicates the number of repetitions of $CH_2$, may be selected from 0, 1, and 2. When n11 is 0, it means a single bond. For example, in Formula 1, n11 may be selected from 0 and 1, but is not limited thereto.

In Formula 1, $R_{11}$ may be selected from hydrogen and a $C_1$-$C_7$ alkyl group.

For example, $R_{11}$ in Formula 1 may be selected from hydrogen, a methyl group, an ethyl group, a propyl group, a butyl group, and a pentyl group, but is not limited thereto.

In an exemplary embodiment of the present invention, $R_{11}$ in Formula 1 may be selected from hydrogen, a methyl group, an ethyl group, an n-propyl group, an n-butyl group, and an n-pentyl group, but is not limited thereto.

In an exemplary embodiment of the present invention, $R_{11}$ in Formula 1 may be selected from hydrogen, a methyl group, an ethyl group, and an n-propyl group, but is not limited thereto.

In Formula 1, $R_{12}$ may be selected from hydrogen, —F, a $C_1$-$C_5$ alkyl group, a $C_1$-$C_5$ alkoxy group, a $C_2$-$C_5$ alkenyl group, a $C_1$-$C_5$ alkyl group substituted with —F, a $C_1$-$C_5$ alkoxy group substituted with —F, and—a $C_2$-$C_5$ alkenyl group substituted with —F.

For example, $R_{12}$ in Formula 1 may be selected from hydrogen, —F, $C_1$-$C_6$ alkyl group, a $C_1$-$C_5$ alkoxy group, a $C_2$-$C_5$ alkenyl group, and a $C_1$-$C_5$ alkyl group substituted with —F, but is not limited thereto.

In an exemplary embodiment of the present invention, $R_{12}$ in Formula 1 may be selected from hydrogen, —F, a methyl group, an ethyl group, a propyl group, a butyl group, a pentyl group, a hexyl group, a methoxy group, an ethoxy group, a propoxy group, a butoxy group, a pentoxy group, an ethenyl group, a prophenyl group, a butenyl group, a pentenyl group, and a methyl group, an ethyl group, an n-propyl group, an n-butyl group, an n-pentyl group, and an n-hexyl group, each substituted with —F, but is not limited thereto.

In an exemplary embodiment of the present invention, $R_{12}$ in Formula 1 may be selected from hydrogen, —F, a methyl group, an ethyl group, an n-propyl group, an n-butyl group, an n-pentyl group, an n-hexyl group, a methoxy group, an ethoxy group, an n-propoxy group, an n-butoxy group, an n-pentoxy group, an ethenyl group, a 1-prophenyl group, a 2-prophenyl group, a 1-butenyl group, a 2-butenyl group, a 1-pentenyl group, a 2-pentenyl group, and a methyl group, an ethyl group, an n-propyl group, an n-butyl group, an n-pentyl group, and an n-hexyl group, each substituted with but is not limited thereto.

The liquid crystal compound represented by Formula 1 may also be referred to as a "first liquid crystal compound" herein.

The first liquid crystal compound may be represented by one of Formulae 1-1 to 1-3, but is not limited thereto:

<Formula 1-1>

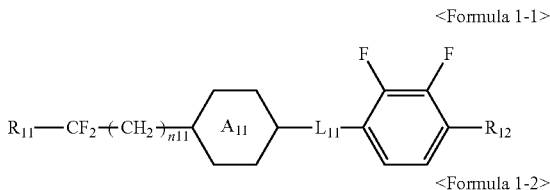

<Formula 1-2>

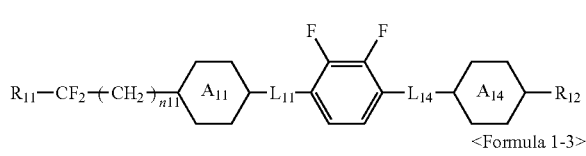

<Formula 1-3>

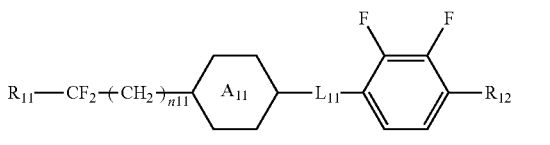

wherein, in Formulae 1-1 to 1-3,

$L_{11}$, $L_{14}$, n11, $R_{11}$, and $R_{12}$ may be the same as those defined in conjunction with Formula 1.

The first liquid crystal compound may be one of Compounds 11 to 56, 67 to 79, and 83 to 94, but is not limited thereto:

(11)

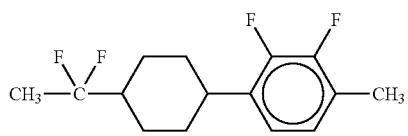

(12)

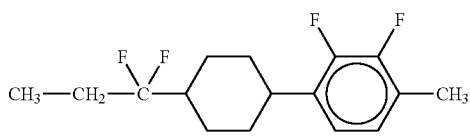

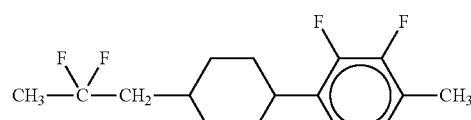
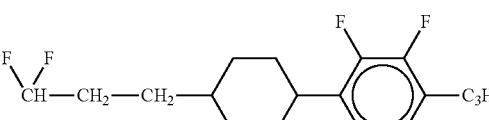
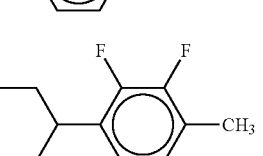
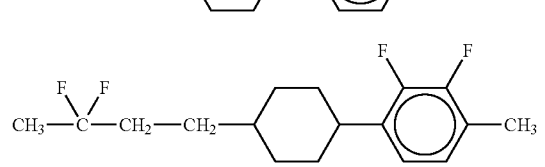
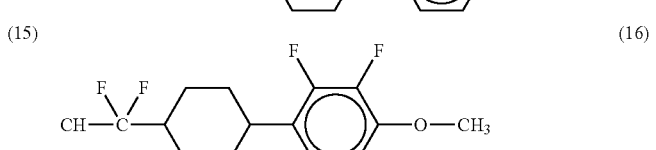
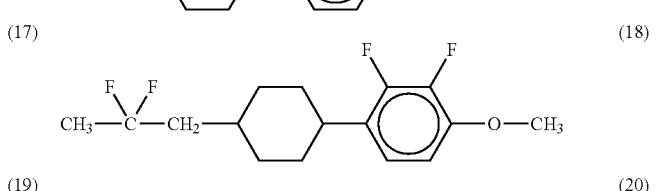
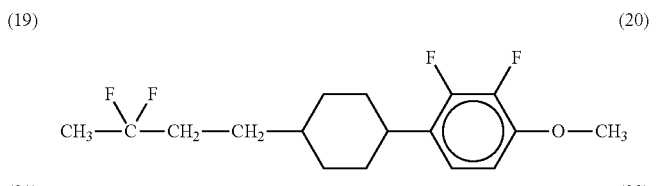
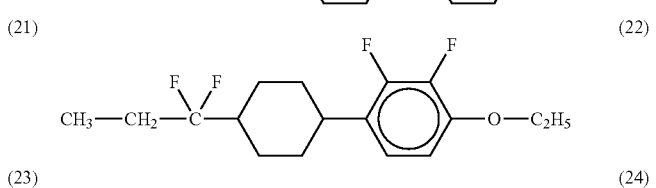
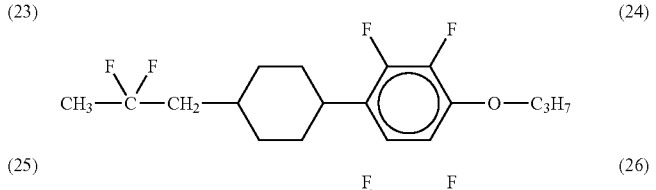
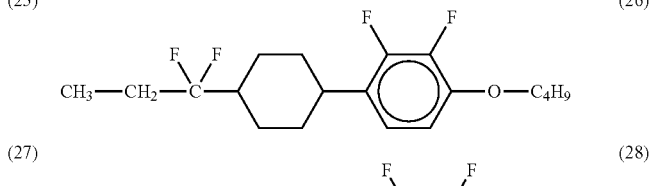
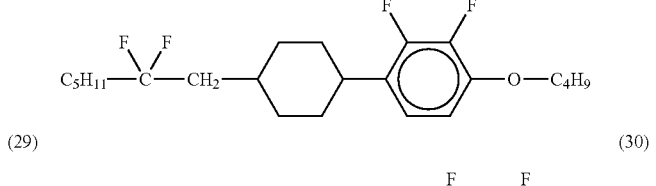
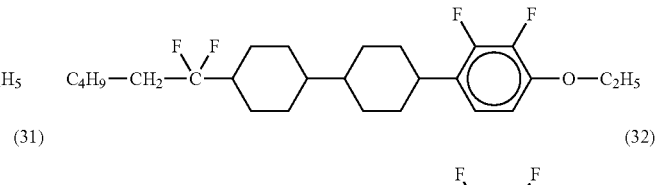
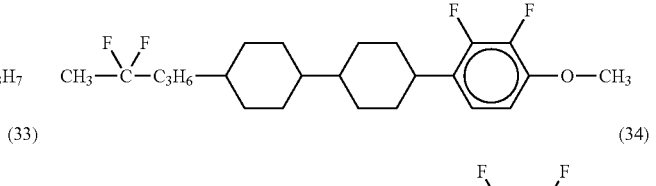
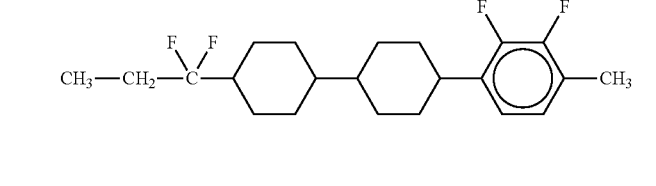

-continued
(35) 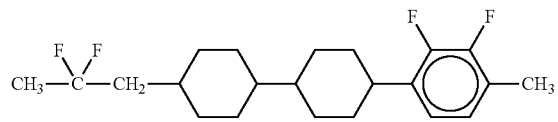
(36) 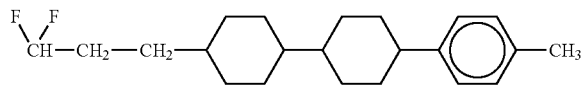
(37) 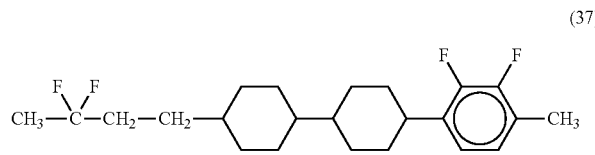
(38) 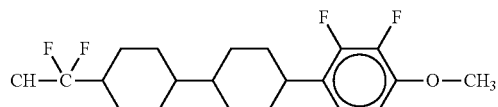
(39) 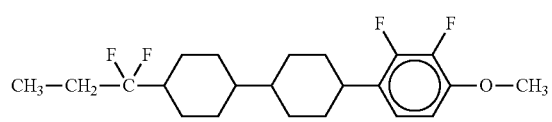
(40) 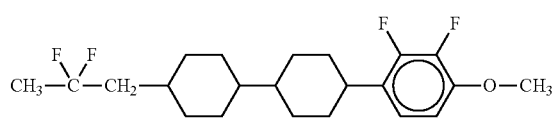
(41) 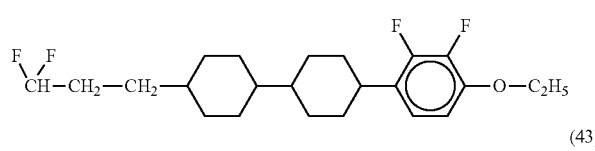
(42) 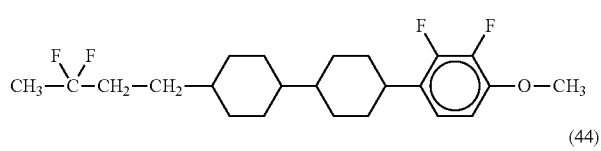
(43) 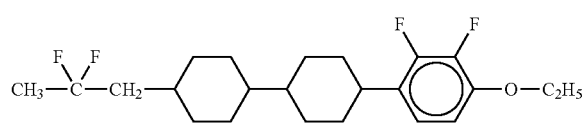
(44) 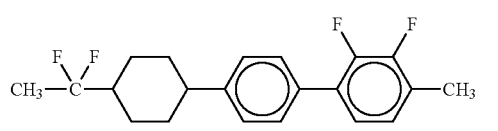
(45) 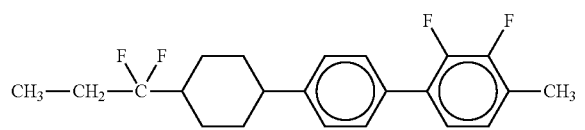
(46) 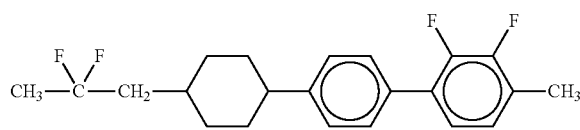
(47) 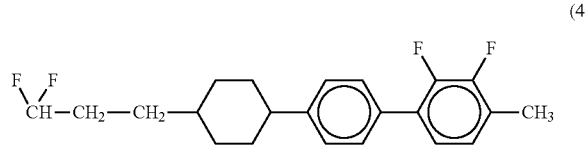
(48) 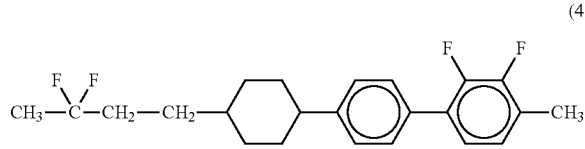
(49) 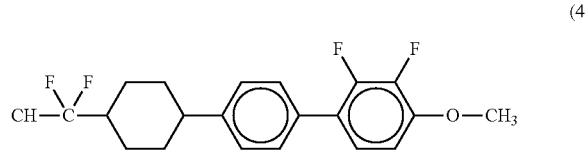
(50) 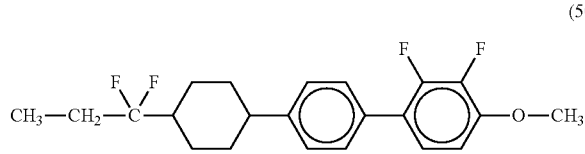
(51) 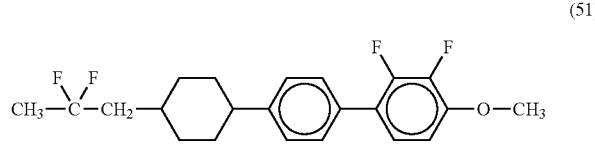
(52) 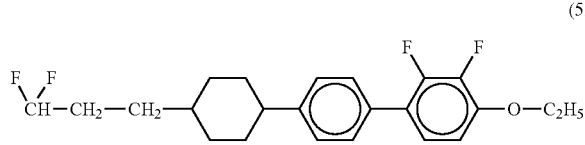
(53) 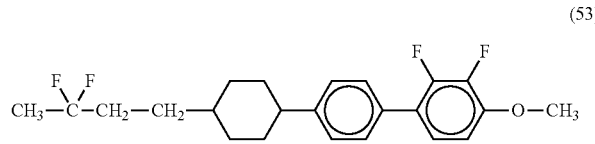
(54) 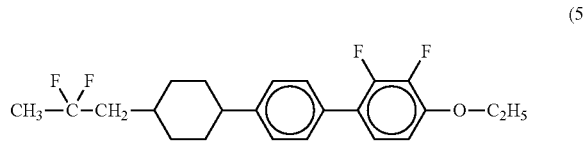
(55) 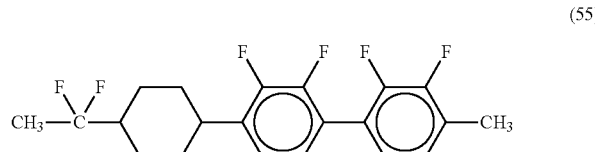
(56) 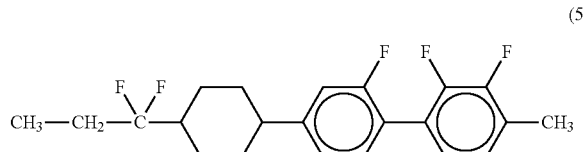

-continued
(67)
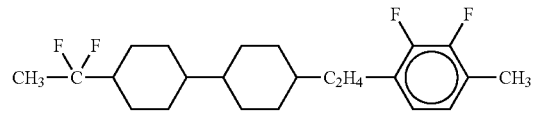
(68)
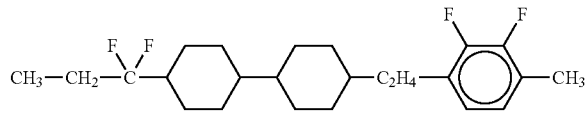
(69)
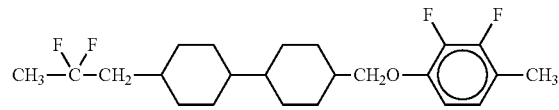
(70)
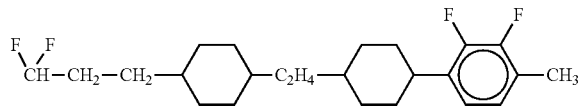
(71)
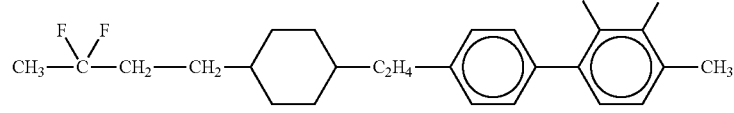
(72)
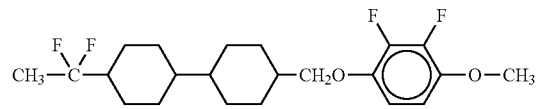
(73)
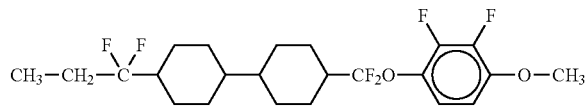
(74)
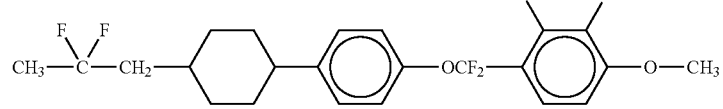
(75)
(76)
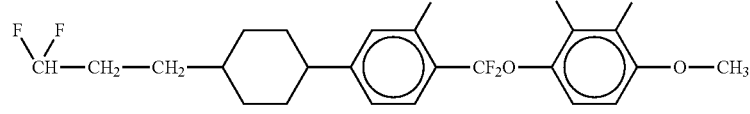
(77)
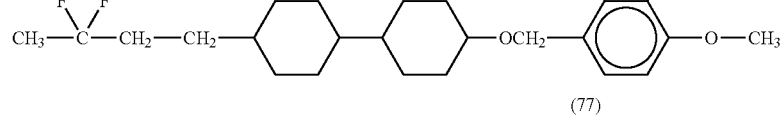
(78)
(79)
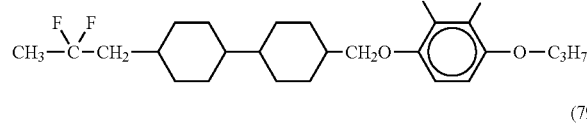
(83)
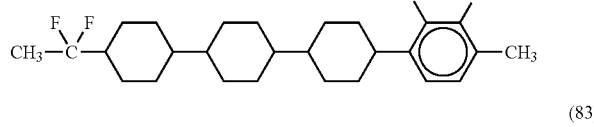
(72)
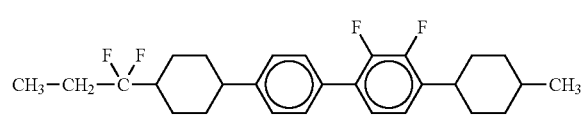
(84)
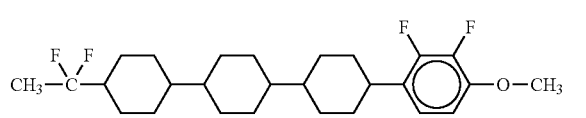
(85)
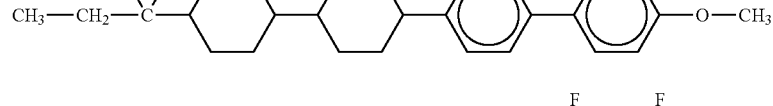

-continued

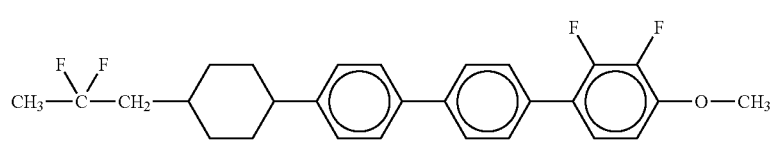
(86)

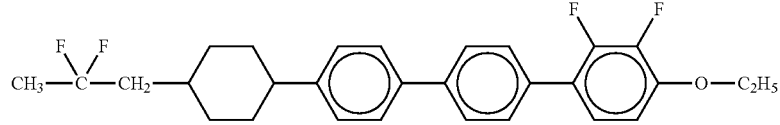
(87)

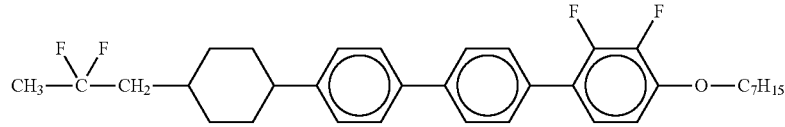
(88)

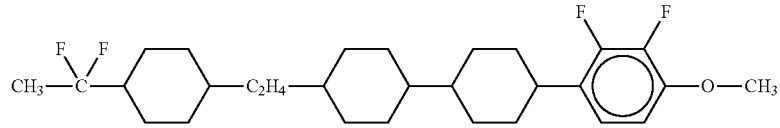
(89)

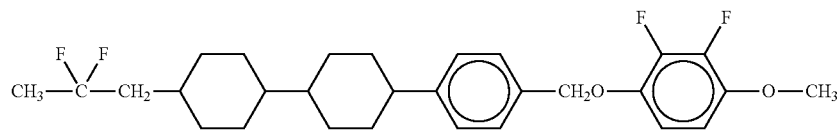
(90)

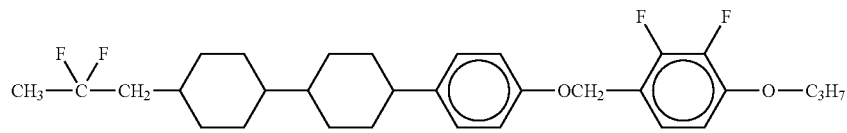
(91)

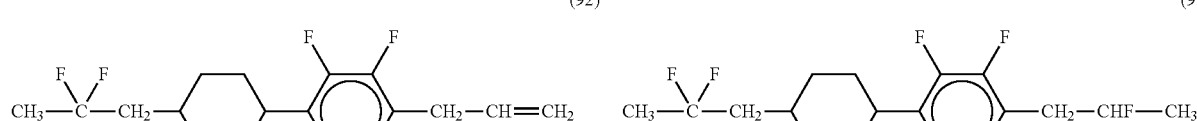
(92) (93)

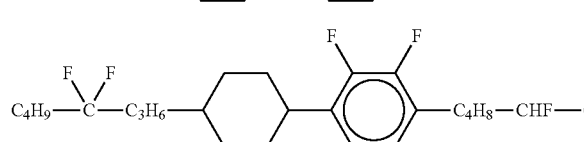
(94)

In Compounds 11 to 56, 67 to 79, and 83 to 94, $C_3H_7$ may be an n-propyl group, $C_4H_9$ may be an n-butyl group, and $C_5H_{11}$ may be an n-pentyl group. However, exemplary embodiments of the present invention are not limited thereto.

According to an exemplary embodiment of the present invention, a liquid crystal composition may include any of the first liquid crystal compounds described above.

For example, in the liquid crystal composition, the amount of the first liquid crystal compound may be in a range of about 0.1 wt % to about 80 wt %. For example, the amount of the first liquid crystal compound may be about 1 wt % or more, about 5 wt % or more, or about 10 wt % or more, but is not limited thereto. In an exemplary embodiment of the present invention, the amount of the first liquid crystal compound may be about 55 wt % or less, about 50 wt % or less, or about 45 wt % or less, but is not limited thereto. In an exemplary embodiment of the present invention, the amount of the first liquid crystal compound may be in a range of about 5 wt % to about 30 wt %, but is not limited thereto.

When the amount of the first liquid crystal compound is within these ranges, the liquid crystal composition may have a relatively low viscosity.

Due to the inclusion of the first liquid crystal compound, the specific resistance and voltage holding ratio (VHR) of the liquid crystal composition may be improved. Accordingly, a liquid crystal display including the liquid crystal composition may have an increased contrast. The liquid crystal composition may be more resistant against UV rays due to the inclusion of the first liquid crystal compound. Accordingly, a liquid crystal display including the liquid crystal compound may have an increased yield.

The liquid crystal composition may further include a second liquid crystal compound represented by Formula 2. However, exemplary embodiments of the present invention are not limited thereto:

<Formula 2>

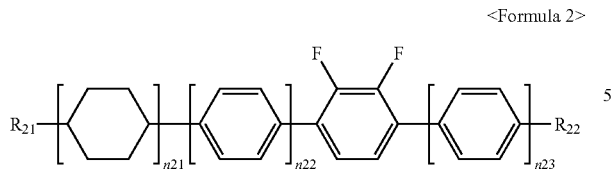

In Formula 2, $R_{21}$ and $R_{22}$ may be each independently selected from a $C_1$-$C_7$ alkyl group, a $C_1$-$C_7$ alkoxy group, and a $C_2$-$C_7$ alkenyl group;

n21, n22, and n23 may be each independently selected from 0, 1, 2, and 3; and a sum of n21, n22, and n23 may be selected from 1, 2, and 3.

In an exemplary embodiment of the present invention, when the liquid crystal composition includes the second liquid crystal compound of Formula 2 where the sum of n21, n22, and n23 is 1, the amount of the second liquid crystal compound may be in a range of about 0.1 wt % to about 40 wt %, but is not limited thereto. When the sum of n21, n22, and n23 in Formula 2 is 1, the second liquid crystal compound may have a relatively low liquid crystal operating temperature Tni. When the sum of n21, n22, and n23 in Formula 2 is 1 and the amount of the second liquid crystal compound is within the above range, the liquid crystal composition may have a liquid crystal operating temperature Tni suitable for commercial purposes.

In an exemplary embodiment of the present invention, when the liquid crystal composition includes a second liquid crystal compound of Formula 2 where the sum of n21, n22, and n23 is 2, the amount of the second liquid crystal compound may be in a range of about 0.1 wt % to about 60 wt %, but is not limited thereto. When the sum of n21, n22, and n23 in Formula 2 is 2 and the amount of the second liquid crystal compound is within this range, the liquid crystal composition may have a viscosity suitable for commercial purposes.

In an exemplary embodiment of the present invention, when the liquid crystal composition includes the second liquid crystal compound of Formula 2 where the sum of n21, n22, and n23 is 3, the amount of the second liquid crystal compound may be in a range of about 0.1 wt % to about 30 wt %, but is not limited thereto. When the sum of n21 n22, and n23 in Formula 2 is 3, the second liquid crystal compound may have a relatively high melting point. Accordingly, when the amount of the second liquid crystal compound is within this range, the liquid crystal composition may have a relatively low degree of crystallinity.

For example, in Formula 2, $R_{21}$ may a $C_1$-$C_7$ alkyl group; and $R_{22}$ may be selected from a $C_1$-$C_5$ alkyl group and a $C_1$-$C_5$ alkoxy group. However, exemplary embodiments of the present invention are not limited thereto.

In an exemplary embodiment of the present invention, in Formula 2, $R_{21}$ may be selected from a methyl group, an ethyl group, a propyl group, a butyl group, a pentyl group, a hexyl group, and a heptyl group; and $R_{22}$ may be selected from a methyl group, an ethyl group, a propyl group, a butyl group, a pentyl group, a methoxy group, and an ethoxy group. However, exemplary embodiments of the present invention are not limited thereto.

The second liquid crystal compound may be represented by one of Formulae 2-1 to 2-4. However, exemplary embodiments of the present invention are not limited thereto:

<Formula 2-1>

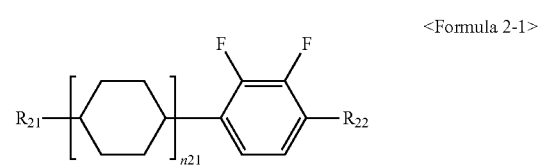

<Formula 2-2>

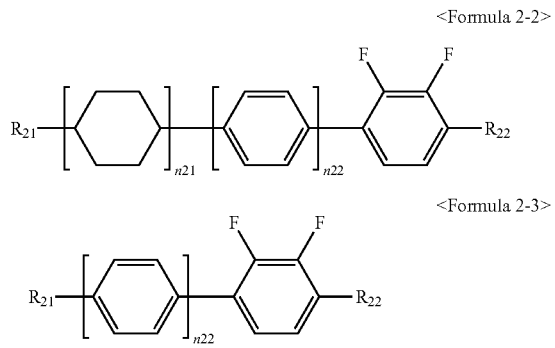

<Formula 2-3>

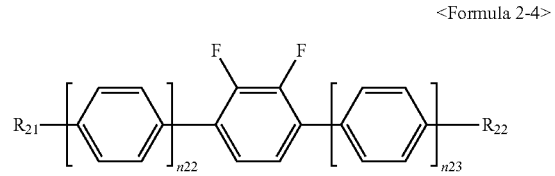

<Formula 2-4>

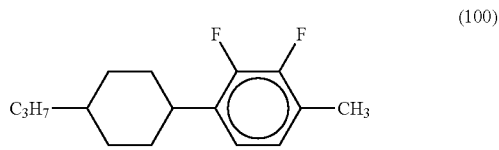

In Formulae 2-1 to 2-4, $R_{21}$, $R_{22}$, n21, n22, and n23 may be the same as those defined with regard to Formula 2.

The second liquid crystal compound may be one of Compounds 100 to 142, but is not limited thereto:

(100)

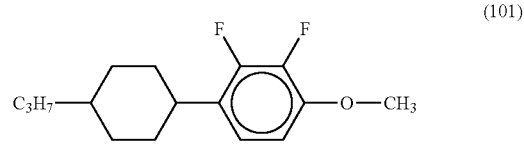

(101)

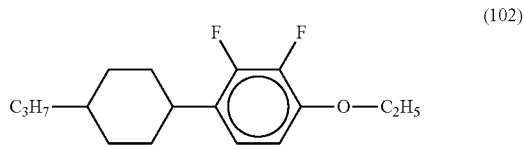

(102)

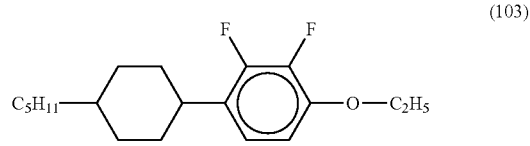

(103)

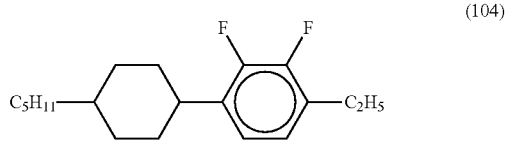

(104)

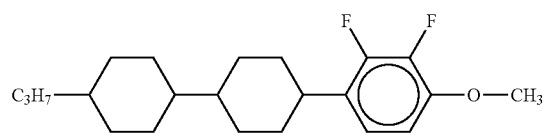
(105)
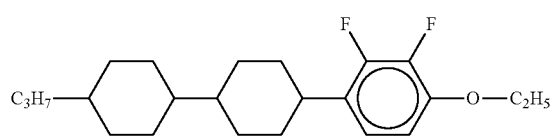
(106)
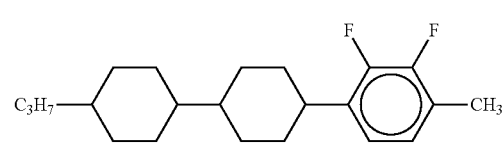
(107)
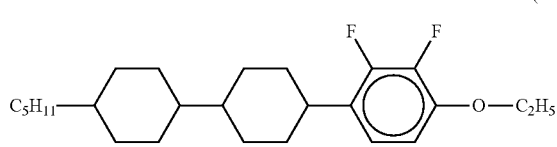
(108)
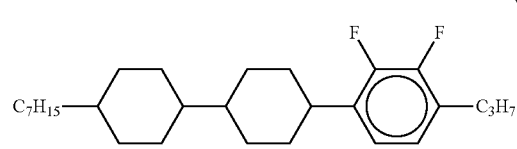
(109)
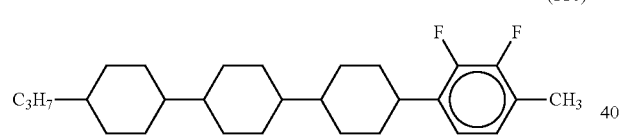
(110)
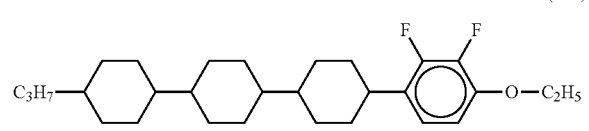
(111)
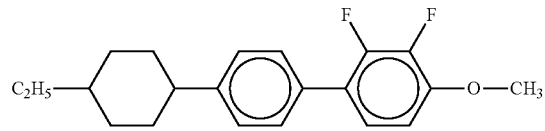
(112)
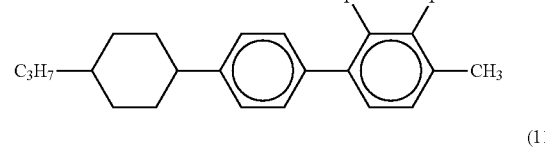
(113)
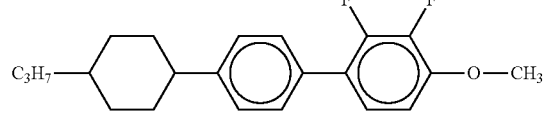
(114)
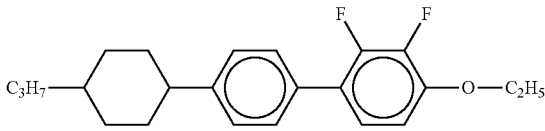
(115)
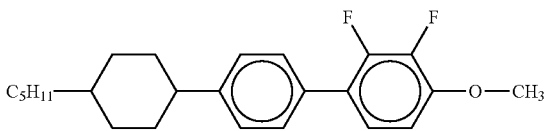
(116)
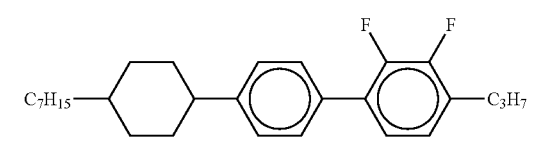
(117)
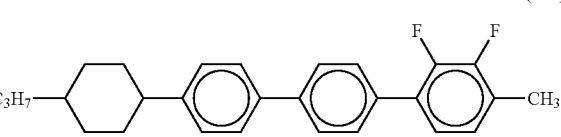
(118)
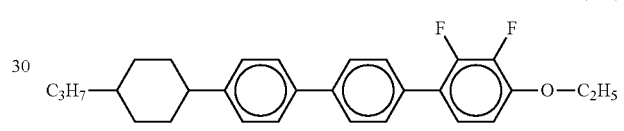
(119)
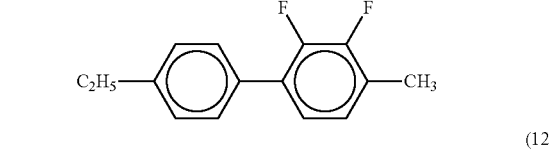
(120)
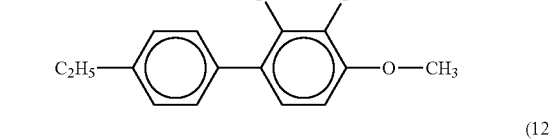
(121)
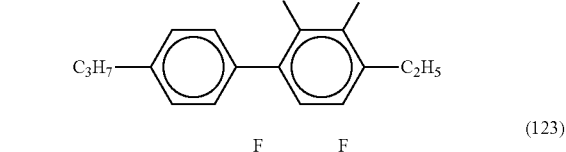
(122)
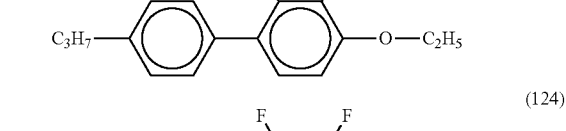
(123)
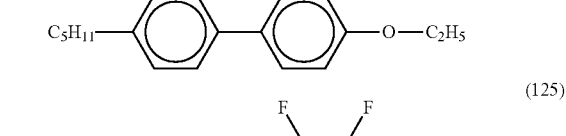
(124)
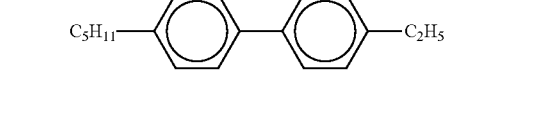
(125)

In Compounds 100 to 142, $C_3H_7$ may be an n-propyl group, $C_4H_9$ may be an n-butyl group, $C_5H_{11}$ may be an n-pentyl group, $C_6H_{13}$ may be an n-hexyl group, and $C_7H_{15}$ may be an n-heptyl group. However, exemplary embodiments of the present invention are not limited thereto.

The liquid crystal composition may include a third liquid crystal compound represented by Formula 3. However, exemplary embodiments of the present invention are not limited thereto:

<Formula 3>

$$R_{31}{-}{\left[\phantom{\rule{0ex}{0ex}}\text{Cy}\phantom{\rule{0ex}{0ex}}\right]}_{n31}{-}{\left[\phantom{\rule{0ex}{0ex}}\text{Ph}\phantom{\rule{0ex}{0ex}}\right]}_{n32}{-}{\left[\phantom{\rule{0ex}{0ex}}\text{Ph}(X_{31})\phantom{\rule{0ex}{0ex}}\right]}_{n33}{-}{\left[\phantom{\rule{0ex}{0ex}}\text{Ph}\phantom{\rule{0ex}{0ex}}\right]}_{n34}{-}R_{32}$$

In Formula 3, $R_{31}$ and $R_{32}$ may be each independently selected from a $C_1$-$C_7$ alkyl group, a $C_1$-$C_7$ alkoxy group, and a $C_2$-$C_7$ alkenyl group;

$X_{31}$ may be selected from hydrogen and —F;

n31, n32, n33, and n34 may be each independently selected from 0, 1, 2, and 3; and a sum of n31, n32, n33, and n34 may be selected from 2, 3, and 4.

In an exemplary embodiment of the present invention, when the liquid crystal composition includes the third liquid crystal compound of Formula 3 where the sum of n31, n32, n33, and n34 is 2, the amount of the third liquid crystal compound may be in a range of about 0.1 wt % to about 50 wt %, but is not limited thereto. When the sum of n31, n32, n33, and n34 in Formula 3 is 2 and the amount of the third liquid crystal compound is within this range, the liquid crystal composition may have a liquid crystal operating temperature Tni suitable for commercial purposes.

For example, when the liquid crystal composition includes the third liquid crystal compound of Formula 3 where the sum of n31, n32, n33, and n34 is 3, the amount of the third liquid crystal compound may be in a range of about 0.1 wt % to about 50 wt %, but is not limited thereto. When the sum of n31, n32, n33, and n34 is 3, and the amount of the third liquid crystal compound is within this range, the liquid crystal composition may have a viscosity suitable for commercial purposes.

For example, when the liquid crystal composition includes the third liquid crystal compound of Formula 3 where the sum of n31, n32, n33, and n34 is 4, the amount of the third liquid crystal compound may be in a range of about 0.1 wt % to about 30 wt %, but is not limited thereto. When the sum of n31, n32, n33, and n34 is 4, the third liquid crystal compound may have a relatively high melting point. Accordingly, when the amount of the third liquid crystal composition is within this range, the liquid crystal composition may have a relatively low degree of crystallinity.

For example, in Formula 3, $R_{31}$ may be selected from a $C_1$-$C_7$ alkyl group and a $C_2$-$C_7$ alkenyl group; and $R_{32}$ may be selected from a $C_1$-$C_5$ alkyl group, a $C_1$-$C_5$ alkoxy group, and a $C_2$-$C_5$ alkenyl group. However, exemplary embodiments of the present invention are not limited thereto.

In an exemplary embodiment of the present invention, in Formula 3, $R_{31}$ may be selected from a methyl group, an ethyl group, a propyl group, a butyl group, a pentyl group, a hexyl group, a heptyl group, and an ethenyl group; and $R_{32}$ may be selected from a methyl group, an ethyl group, a propyl group, a butyl group, a pentyl group, a methoxy group, an ethoxy group, an n-propoxy group, an ethenyl group, and a prophenyl group. However, exemplary embodiments of the present invention are not limited thereto.

The third liquid crystal compound may be represented by one of Formulae 3-1 to 3-3, but is not limited thereto:

<Formula 3-1>

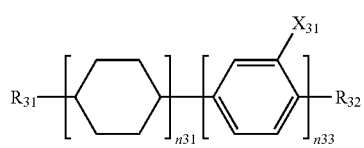

<Formula 3-2>

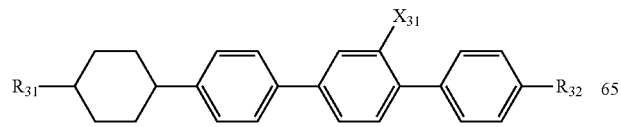

<Formula 3-3>

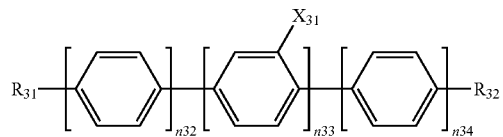

In Formulae 3-1 to 3-3, $R_{31}$, $R_{32}$, $X_{31}$, n31, n32, n33, and n34 may be the same as those defined with regard to Formula 3.

The third liquid crystal compound may be one of Compounds 143 to 184. However, exemplary embodiments of the present invention are not limited thereto:

(143)
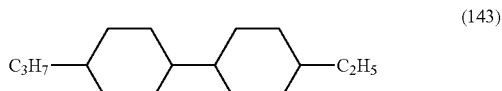

(144)
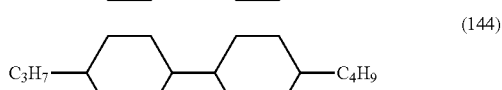

(145)
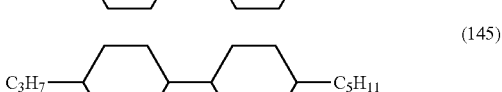

(146)
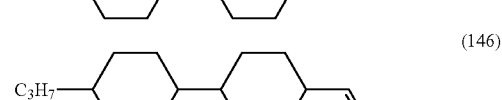

(147)
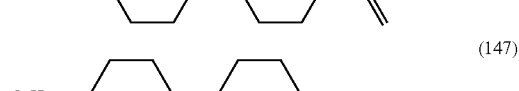

(148)
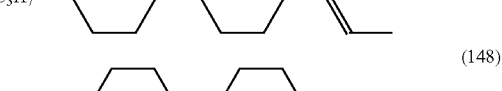

(149)
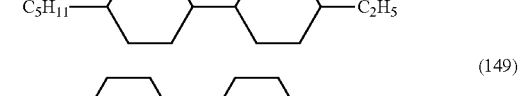

(150)
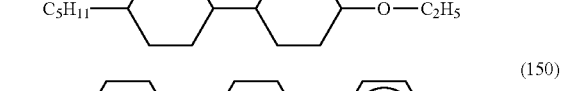

(151)
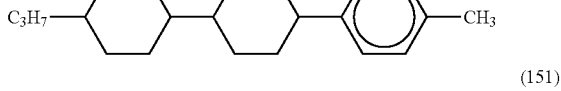

(152)
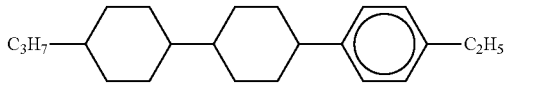

(153)
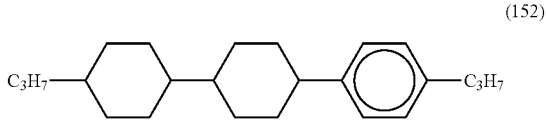

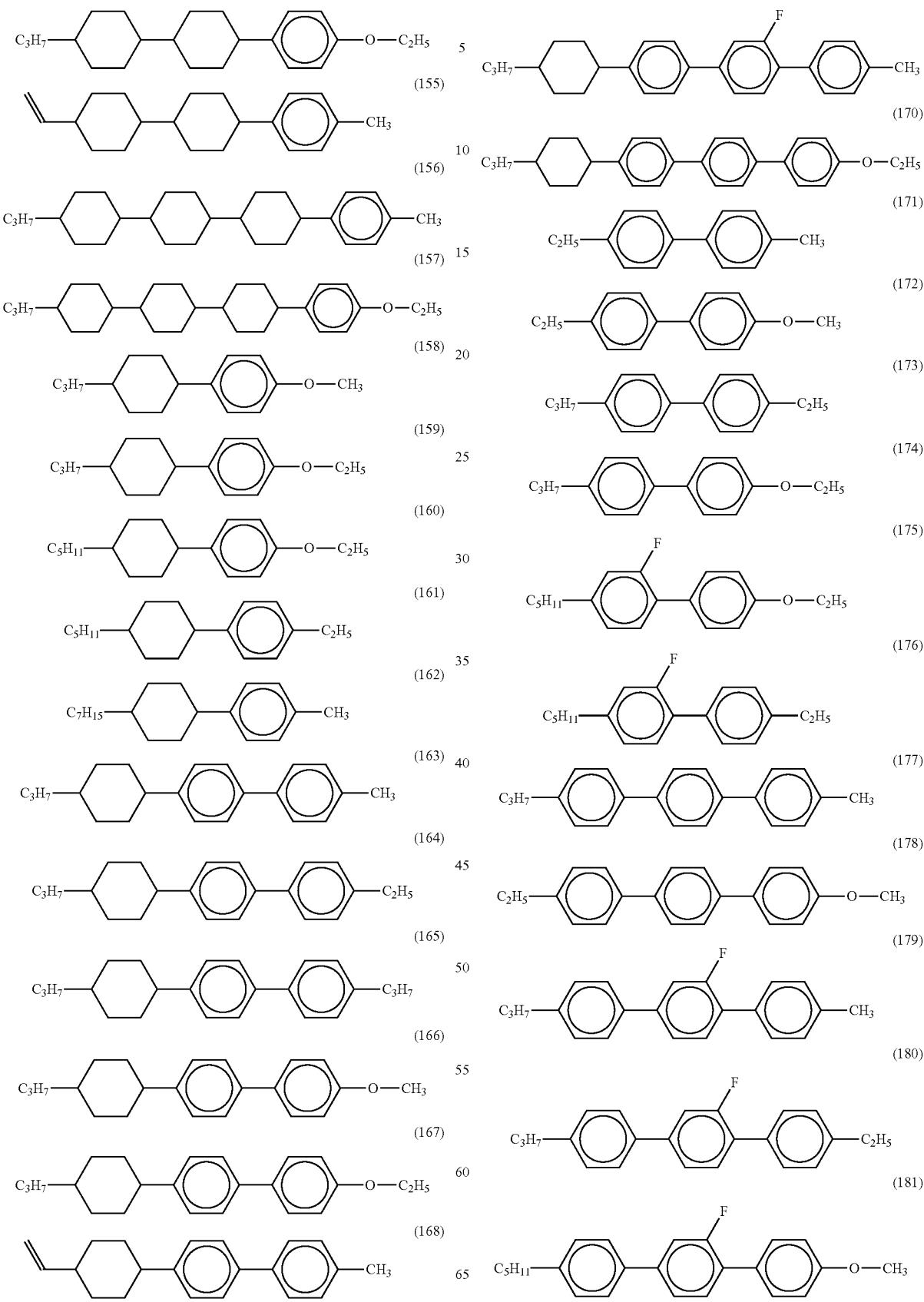

-continued

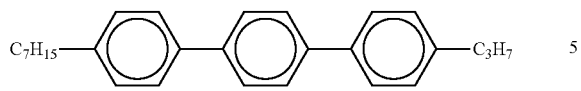
(182)

(183)

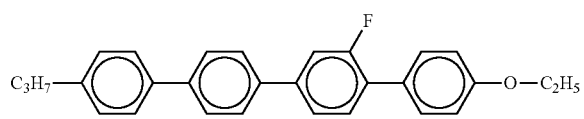
(184)

In Compounds 143 to 184, $C_3H_7$ may be an n-propyl group, $C_5H_{11}$ may be an n-pentyl group, and $C_7H_{15}$ may be an n-heptyl group. However, exemplary embodiments of the present invention are not limited thereto.

The absolute dielectric anisotropy value $|\Delta\epsilon|$ of the third liquid crystal compound may be near to zero. The third liquid crystal compound may be used to control a value of an anisotropy in the refractive index $\Delta n$ of the liquid crystal composition.

The liquid crystal composition may include a fourth liquid crystal compound represented by Formula 4. However, exemplary embodiments of the present invention are not limited thereto:

<Formula 4>

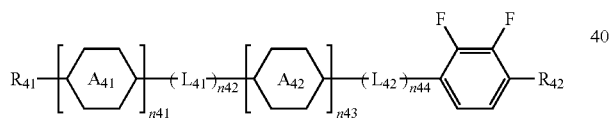

In Formula 4,

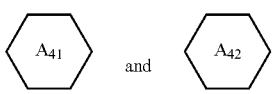 and may be each independently selected from groups represented by Formulae 10-1 to 10-11;

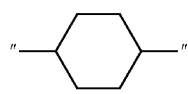
10-1

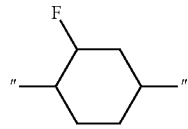
10-2

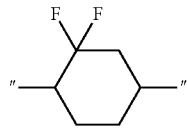
10-3

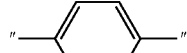
10-4

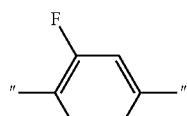
10-5

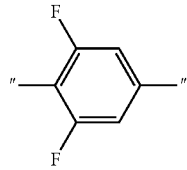
10-6

10-7

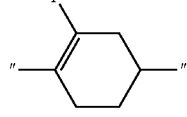
10-8

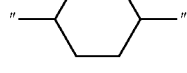
10-9

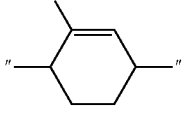
10-10

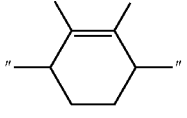
10-11

$L_{41}$ and $L_{42}$ may be each independently selected from —CH$_2$CH$_2$—, —CH$_2$O—, —OCH$_2$—, —CF$_2$O—, and —OCF$_2$—;

$R_{41}$ and $R_{42}$ may be each independently selected from a $C_1$-$C_7$ alkyl group, a $C_1$-$C_7$ alkoxy group, and a $C_2$-$C_7$ alkenyl group;

n41 may be selected from 1, 2, and 3;

n42 to n44 may be each independently selected from 0, 1, 2, and 3; and a sum of n42 and n44 may be selected from 1 and 2, and " in Formulae 10-1 to 10-20 indicates a binding site with an adjacent atom.

For example, when the liquid crystal composition includes the fourth liquid crystal compound of Formula 4 where the sum of n41 and n43 is 1, the amount of the fourth liquid crystal compound may be in a range of about 0.1 wt % to about 30 wt %, but is not limited thereto. When the sum of n41 and n43 in Formula 4 is 1 and the amount of the fourth liquid crystal compound is within this range, the liquid crystal composition may have a liquid crystal operating temperature Tni suitable for commercial purposes.

For example, when the liquid crystal composition includes the fourth liquid crystal compound of Formula 4 where the sum of n41 and n43 is 2, the amount of the fourth liquid crystal compound may be in a range of about 0.1 wt % to about 50 wt %, but is not limited thereto. When the sum of n41 and n43 in Formula 4 is 2 and the amount of the fourth liquid crystal compound is within this range, the liquid crystal composition may have a viscosity suitable for commercial purposes.

For example, when the liquid crystal composition includes the fourth liquid crystal compound of Formula 4 where the sum of n41 and n43 is 3, the amount of the fourth liquid crystal compound may be in a range of about 0.1 wt % to about 30 wt %, but is not limited thereto. When the sum of n41 and n43 in Formula 4 is 3, the fourth liquid crystal compound may have a relatively high melting point. Accordingly, when the amount of the fourth liquid crystal compound is within this range, the liquid crystal composition may have a relatively low degree of crystallinity.

For example, in Formula 4,

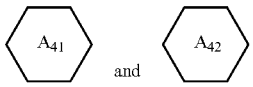

may be each independently selected from groups represented by Formulae 10-1 and 10-6, but are not limited thereto.

For example, in Formula 4, $L_{41}$ and $L_{42}$ may be each independently selected from —CH$_2$CH$_2$—, —CH$_2$O—, and —CF$_2$O—, but are not limited thereto.

For example, in Formula 4, $R_{41}$ may be a $C_1$-$C_5$ alkyl group; and $R_{42}$ may be selected from a $C_1$-$C_5$ alkyl group and a $C_1$-$C_5$ alkoxy group. However, exemplary embodiments of the present invention are not limited thereto.

In an exemplary embodiment of the present invention, in Formula 4, $R_{41}$ may be selected from a methyl group, an ethyl group, a propyl group, a butyl group, and a pentyl group; and $R_{42}$ may be selected from a methyl group, an ethyl group, an n-propyl group, a methoxy group, an ethoxy group, and an n-propoxy group. However, exemplary embodiments of the present invention are not limited thereto.

The fourth liquid crystal compound may be represented by Formula 4-1, but is not limited thereto;

<Formula 4-1>

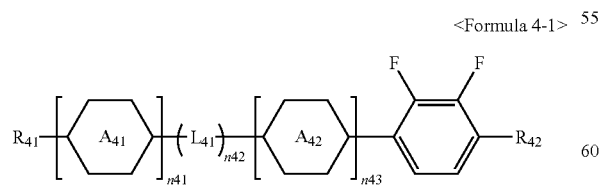

In Formula 4-1, $A_{41}$, $A_{42}$, $L_{41}$, $R_{41}$, $R_{42}$, and n41 to n44 may be the same as those defined with regard to Formula 4.

The fourth liquid crystal compound may be one of Compounds 185 to 199, but is not limited thereto:

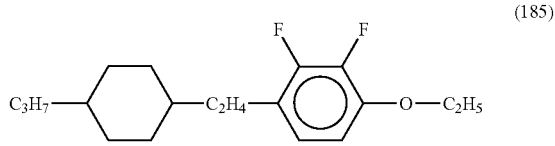

(185)

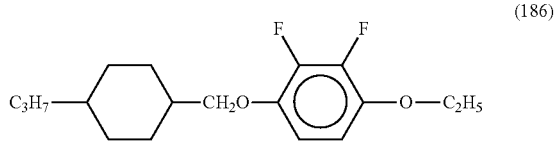

(186)

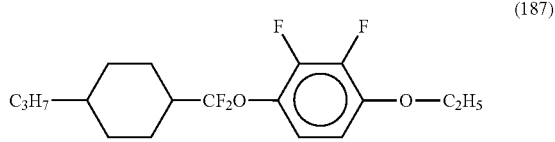

(187)

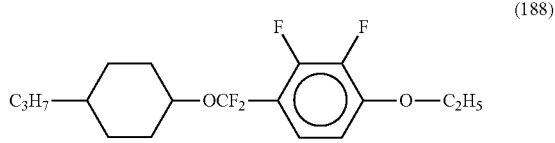

(188)

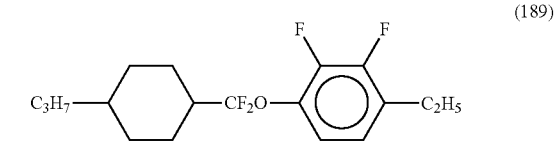

(189)

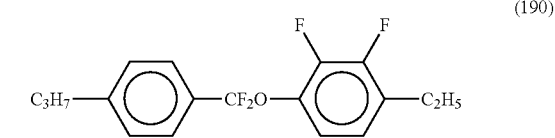

(190)

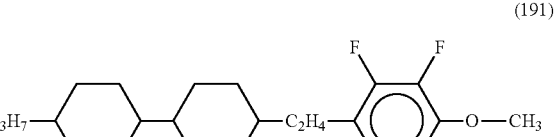

(191)

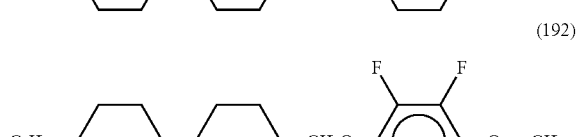

(192)

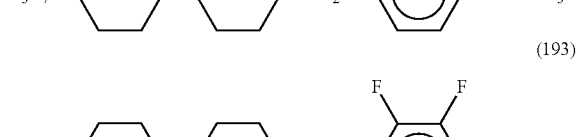

(193)

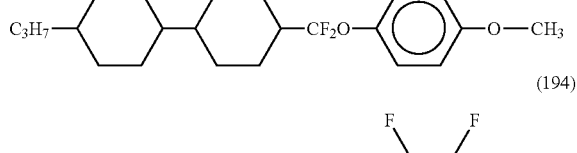

(194)

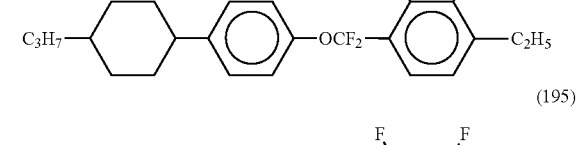

(195)

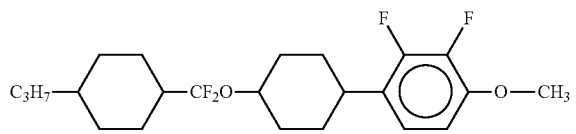 (196)

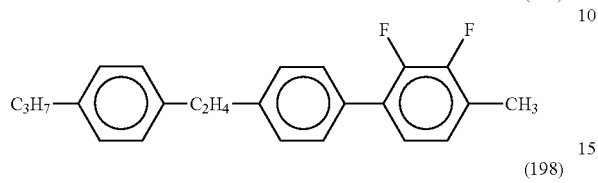 (197)

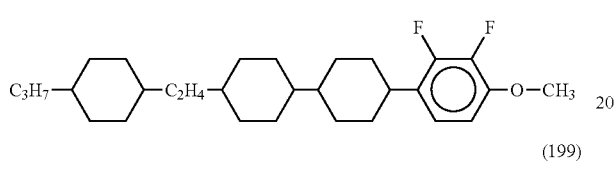 (198)

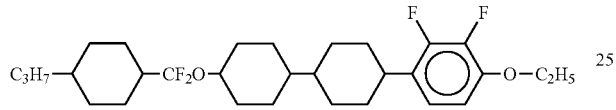 (199)

In Compounds 185 to 199, $C_3H_7$ may be an n-propyl group.

The liquid crystal composition may include a fifth liquid crystal compound represented by Formula 5. However, exemplary embodiments of the present invention are not limited thereto:

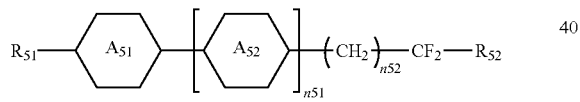
<Formula 5>

In Formula 5,

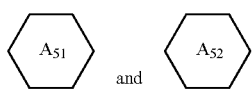

may be each independently selected from groups represented by Formulae 10-1 to 10-11:

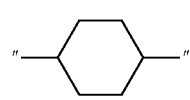 10-1

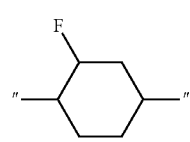 10-2

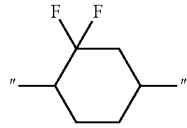 10-3

 10-4

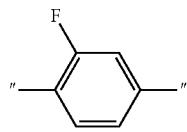 10-5

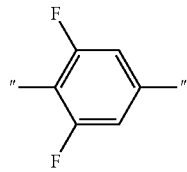 10-6

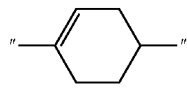 10-7

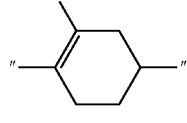 10-8

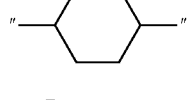 10-9

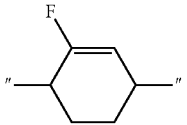 10-10

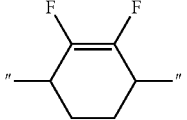 10-11

In Formulae 10-1 to 10-11, " indicates a binding site with an adjacent atom.

For example, in Formula 5,

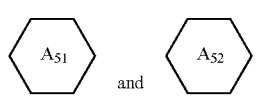

may be each independently selected from groups represented by Formulae 10-1 to 10-6, but are not limited thereto.

In an exemplary embodiment of the present invention, in Formula 5,

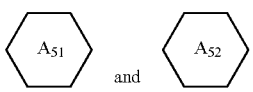

may be each independently selected from groups represented by Formulae 10-1 to 10-3, but are not limited thereto.

In an exemplary embodiment of the present invention, in Formula 5,

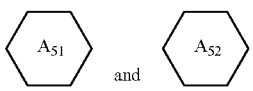

may be a group represented by Formula 10-1, but are not limited thereto.

In Formula 5, n51, which indicates the number of repetitions of

may be selected from 1, 2, and 3. When n51 is 2 or more, the plurality of

s may be the same or different. For example, n51 in Formula 5 may be 1, but is not limited thereto.

In Formula 5, n52, which indicates the number of repetitions of $CH_2$, may be selected from 0, 1, 2, 3, and 4. When n52 is 0, $(CH_2)_{n52}$ means a single bond. For example, in Formula 5, n52 may be selected from 0, 1, and 2, but is not limited thereto.

In Formula 5, $R_{51}$ may be selected from hydrogen, a $C_1$-$C_5$ alkyl group, a $C_1$-$C_5$ alkoxy group, and a $C_2$-$C_5$ alkenyl group, and a $C_1$-$C_5$ alkyl group substituted with —F, a $C_1$-$C_5$ alkoxy group substituted with —F, and a $C_2$-$C_5$ alkenyl group substituted with —F.

For example, $R_{51}$ in Formula 5 may be selected from hydrogen, a $C_1$-$C_5$ alkyl group, a $C_1$-$C_5$ alkoxy group, and a $C_2$-$C_5$ alkenyl group, but is not limited thereto.

In an exemplary embodiment of the present invention, $R_{51}$ in Formula 5 may be selected from hydrogen, a methyl group, an ethyl group, a propyl group, a butyl group, a pentyl group, a methoxy group, an ethoxy group, a propoxy group, a butoxy group, a pentoxy group, an ethenyl group, a prophenyl group, a butenyl group, and a pentenyl group, but is not limited thereto.

In an exemplary embodiment of the present invention, $R_{51}$ in Formula 5 may be selected from hydrogen, a methyl group, an ethyl group, an n-propyl group, an n-butyl group, an n-pentyl group, a methoxy group, an ethoxy group, an n-propoxy group, an n-butoxy group, an n-pentoxy group, an ethenyl group, a 1-prophenyl group, a 2-prophenyl group, a 1-butenyl group, a 2-butenyl group, a 1-pentenyl group, and a 2-pentenyl group, but is not limited thereto.

In an exemplary embodiment of the present invention, $R_{51}$ in Formula 5 may be selected from a methyl group, an ethyl group, an n-propyl group, a methoxy group, an ethoxy group, an n-propoxy group, an ethenyl group, and a 1-prophenyl group, but is not limited thereto.

In Formula 5, $R_{52}$ may be selected from hydrogen and a $C_1$-$C_5$ alkyl group.

For example, $R_{52}$ in Formula 5 may be selected from hydrogen, a methyl group, an ethyl group, a propyl group, a butyl group, and a pentyl group, but is not limited thereto.

In an exemplary embodiment of the present invention, $R_{52}$ in Formula 5 may be selected from hydrogen, a methyl group, an ethyl group, an n-propyl group, an n-butyl group, and an n-pentyl group, but is not limited thereto.

In an exemplary embodiment of the present invention, $R_{52}$ in Formula 5 may be selected from hydrogen, a methyl group, an ethyl group, and an n-propyl group, but is not limited thereto.

In Formula 5, when $R_{51}$ and $R_{52}$ are each independently selected from the above-listed substituents, the liquid crystal composition may have a relatively low viscosity and a relatively low volatility.

The fifth liquid crystal compound may be represented by Formula 5-1. However, exemplary embodiments of the present invention are not limited thereto:

<Formula 5-1>

In Formula 5-1, $R_{51}$, $R_{52}$, and n52 may be the same as those defined in conjunction with Formula 5.

The fifth liquid crystal compound may be one of Compounds 200 to 224, but is not limited thereto:

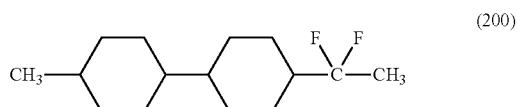
(200)

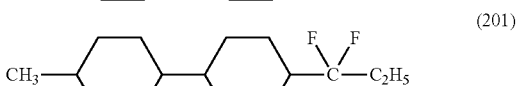
(201)

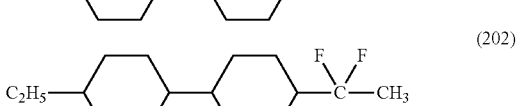
(202)

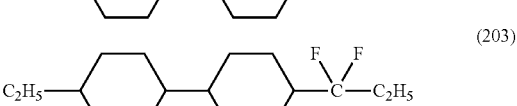
(203)

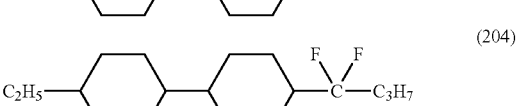
(204)

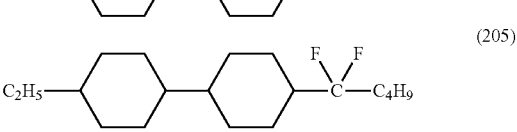
(205)

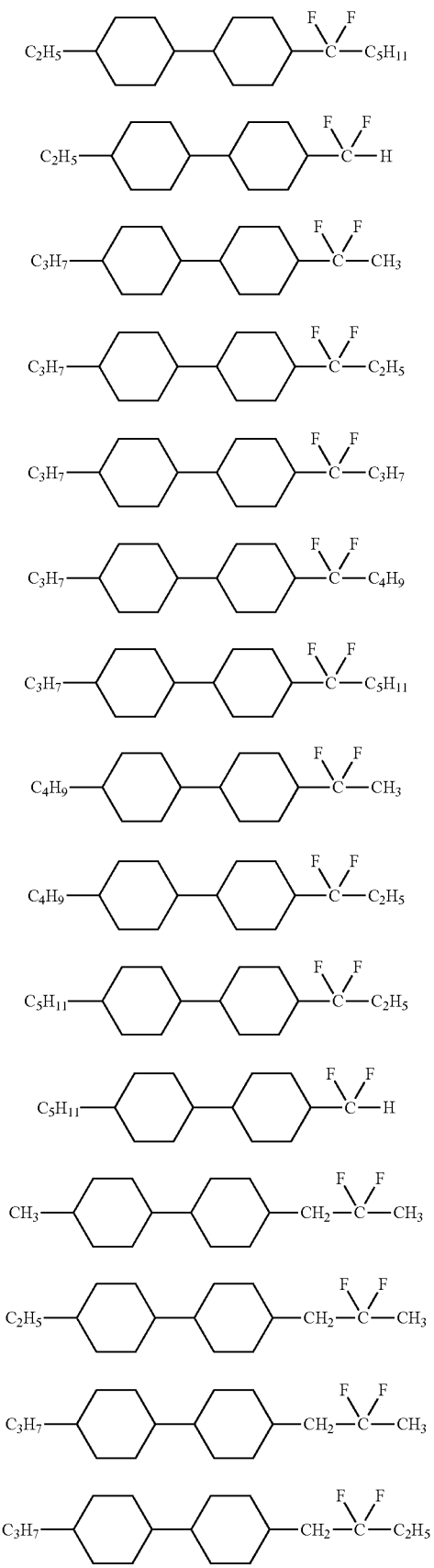
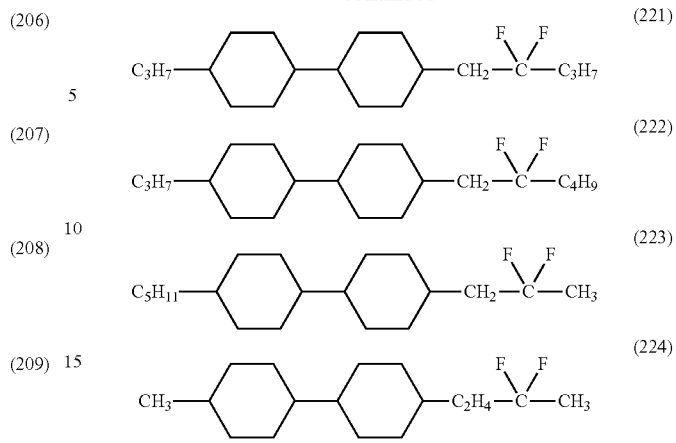

In Compounds 200 to 224, $C_3H_7$ may be an n-propyl group, $C_4H_9$ may be an n-butyl group, and $C_5H_{11}$ may be an n-pentyl group. However, exemplary embodiments of the present invention are not limited thereto.

In the liquid crystal composition, the amount of the fifth liquid crystal compound may be in a range of about 0 wt % to about 60 wt %. When the amount of the fifth liquid crystal compound is within this range, the liquid crystal composition may be highly reliable and may have a relatively high VHR at a relatively low viscosity. For example, the amount of the fifth liquid crystal compound may be 40% or less.

The first liquid crystal compounds, the second liquid crystal compounds, the third liquid crystal compounds, the fourth liquid crystal compounds, and the fifth liquid crystal compounds described above may be obtained using known organic synthesis methods.

For example, the first liquid crystal compound may be synthesized using a method disclosed in Japanese Application Publication 1994-192142, the disclosure of which is incorporated by reference herein in its entirety.

The liquid crystal composition may be prepared using a known method. For example, the liquid crystal composition may be prepared by dissolving such liquid crystal compounds as described above at relatively high temperatures. The liquid crystal composition may be prepared by mixing such liquid crystal compounds as described above with an organic solvent such as acetone, chloroform, or methanol, and then removing the organic solvent.

The liquid crystal composition may include an additive, if desired. For example, the liquid crystal composition may include at least one selected from a chiral agent, a polymerizable additive, and a stabilizing agent. However, exemplary embodiments of the present invention are not limited thereto.

The chiral agent may increase the presence of a desired directional orientation of the liquid crystal compound. When the liquid crystal composition further includes the chiral agent, the liquid crystal composition may be an electrically controlled birefringence (ECB) mode liquid crystal composition or a dynamic scattering (DS) mode liquid crystal composition.

In the liquid crystal composition, the amount of the chiral agent may be in a range of about 0.01 wt % to about 30 wt %, in consideration of preparation costs of the liquid crystal composition, but is not limited thereto.

Non-limiting examples of the chiral agent are the compounds represented by the following formulae:

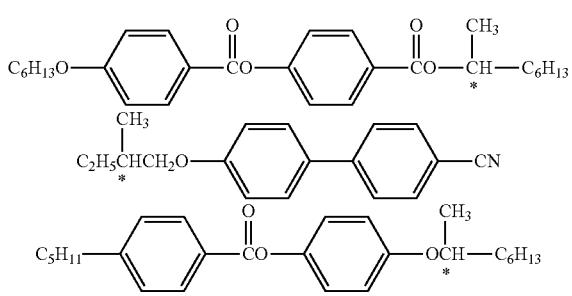

For example, the chiral agent may be selected from Compounds 225 to 232, but is not limited thereto:

(225)

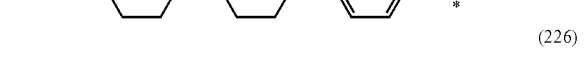
(226)

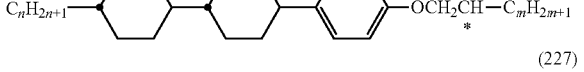
(227)

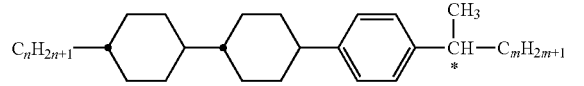
(228)

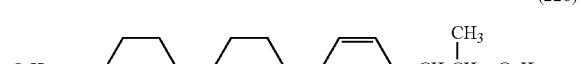
(229)

(230)

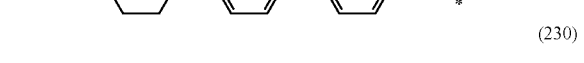
(231)

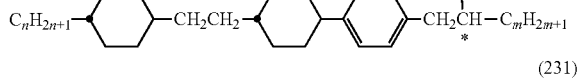
(232)

In Compounds 225 to 232, m may be selected from 2, 3, 4, 5, 6, 7, 8, 9, 10, 11 and 12; and n may be selected from 1, 2, 3, 4, 5, 6, 7, 8, 9, 10, 11, and 12. For example, in Compounds 225 to 232, m may be selected from 2, 3, 4, 5, 6, 7, 8, 9, and 10; and n may be selected from 1, 2, 3, 4, 5, 6, 7, 8, 9, and 10. However, exemplary embodiments of the present invention are not limited thereto.

In the liquid crystal composition, the amount of the polymerizable additive may be in a range of about 0.01 wt % to about 20 wt %, but is not limited thereto. When the liquid crystal composition includes a polymerizable additive, the liquid crystal composition may be used in a liquid crystal display such as a polymer stabilized vertical alignment (PSVA) mode liquid crystal display that controls alignment of liquid crystal molecules through light irradiation.

For example, the polymerizable additive may be Compound 233, but is not limited thereto:

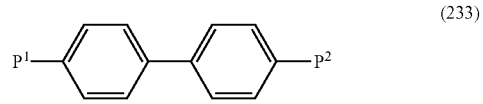
(233)

In Compound 233, $P^1$ and $P^2$ may be each independently selected from an acrylate group, a methacrylate group, a vinyl group, a vinyloxy group, and an epoxy group.

For example, $P^1$ and $P^2$ in Compound 233 may be each independently selected from an acrylate group and a methacrylate group, but are not limited thereto.

In the liquid crystal composition, the amount of the stabilizing agent may be in a range of about 0.0001 wt % to about 5 wt %, but is not limited thereto. For example, the amount of the stabilizing agent may be in a range of about 0.001 wt % to about 1 wt %, but is not limited thereto.

For example, the stabilizing agent may be an antioxidant, but is not limited thereto, Non-limiting examples of the antioxidant are Compounds 234 to 239.

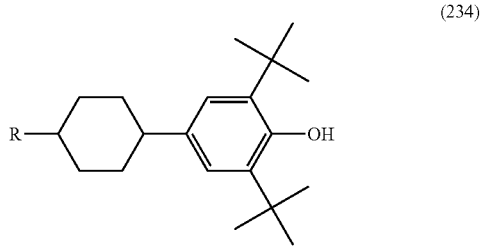
(234)

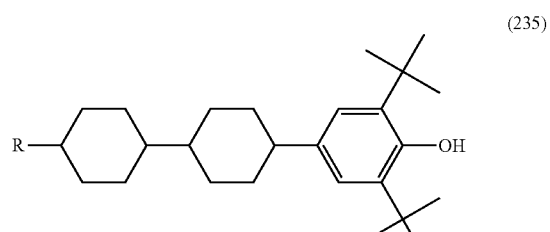
(235)

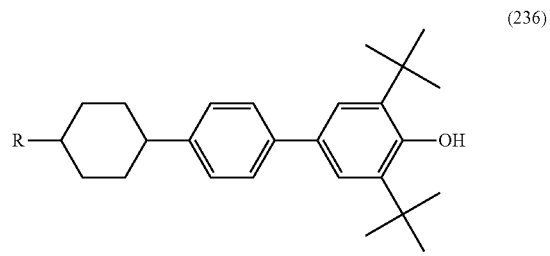
(236)

-continued

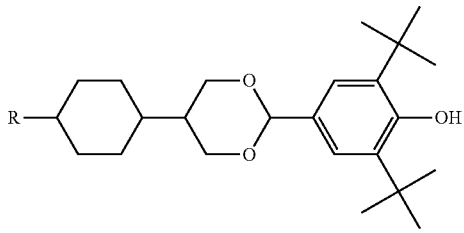

(237)

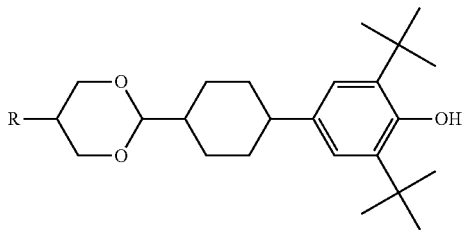

(238)

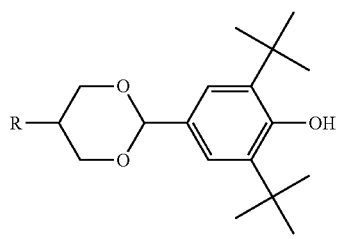

(239)

In Compounds 234 to 239, R may be selected from hydrogen, a $C_1$-$C_{18}$ alkyl group, a $C_1$-$C_{18}$ alkoxy group, and a $C_2$-$C_{18}$ alkenyl group, and a $C_1$-$C_{18}$ alkyl group, a $C_1$-$C_{18}$ alkoxy group, and a $C_2$-$C_{18}$ alkenyl group, each substituted with at least one of a halogen atom and a cyano group.

For example, the stabilizing agent may be a hindered amine light stabilizer (HALS) available from ADEKA Corporation, but is not limited thereto. Non-limiting examples of the HALS are LA-52 (tetrakis(1,2,2,6,6-pentamethyl-4-piperidyl)butane-1,2,3,4-tetracarboxylate), LA-57 (tetrakis(2,2,6,6-tetramethyl-4-piperidyl)butane-1,2,3,4-tetracarboxylate), and LA-72 (bis(1,2,2,6,6-pentamethyl-4-piperidyl)sebacate).

The liquid crystal composition may include a liquid crystal compound with positive dielectric anisotropy, unless the liquid crystal compound with positive dielectric anisotropy damages desired physical properties of the liquid crystal composition.

The liquid crystal composition may be suitable for an AM-LCD, but is not limited thereto. The liquid crystal composition may have a negative dielectric anisotropy.

According to an exemplary embodiment of the present invention, the liquid crystal display may include a first electrode, a second electrode, and a liquid crystal layer disposed between the first electrode and the second electrode. The liquid crystal layer may include any of the liquid crystal compositions according to the above-described embodiments.

The liquid crystal display may be an in-plane switching (IPS) mode liquid crystal display, a fringe field switching (FFS) mode liquid crystal display, a plane-to-line switching (PLS) mode liquid crystal display, a vertical alignment (VA) mode liquid crystal display, a stabilized vertical alignment (SVA) mode liquid crystal display, or a polymer stabilized vertical alignment (PSVA) mode liquid crystal display, but is not limited thereto.

The liquid crystal display may include at least one alignment layer between the first electrode and the liquid crystal layer, and/or an alignment layer between the liquid crystal layer and the second electrode.

In an exemplary embodiment of the present invention, the liquid crystal display including any of the liquid crystal compounds according to the above-described embodiments may have appropriate desired negative dielectric constant, a relatively low viscosity, a relatively high specific resistance, and a relatively high VHR.

As used herein, a $C_1$-$C_7$ alkyl group may refer to a monovalent linear or a branched $C_1$-$C_7$ aliphatic hydrocarbon group. Examples of the $C_1$-$C_7$ alkyl group include a methyl group, an ethyl group, a propyl group, an iso-a butyl group, a sec-butyl group, a tert-butyl group, an n-pentyl group, and a hexyl group.

As used herein, a $C_1$-$C_7$ alkoxy group may refer to a monovalent group represented by —$OA_{101}$ (where $A_{101}$ is a $C_1$-$C_7$ alkyl group). Examples of the $C_1$-$C_7$ alkoxy group include a methoxy group, an ethoxy group, and an isopropoxy group.

As used herein, a $C_2$-$C_{18}$ alkenyl group may refer to a group with at least one carbon-carbon double bond in the middle or at a terminal of the $C_2$-$C_{18}$ alkyl group. Examples of the $C_2$-$C_{18}$ alkenyl group include an ethenyl group, a prophenyl group, and a butenyl group.

Exemplary embodiments of the present invention will now be described in more detail with reference to the following examples. However, these examples are only for illustrative purposes and are not intended to limit the scope of the exemplary embodiments of the present invention.

EXAMPLES

Synthesis Example 1

Synthesis of Compound 22

Compound 22 was synthesized according to Reaction Scheme 1:

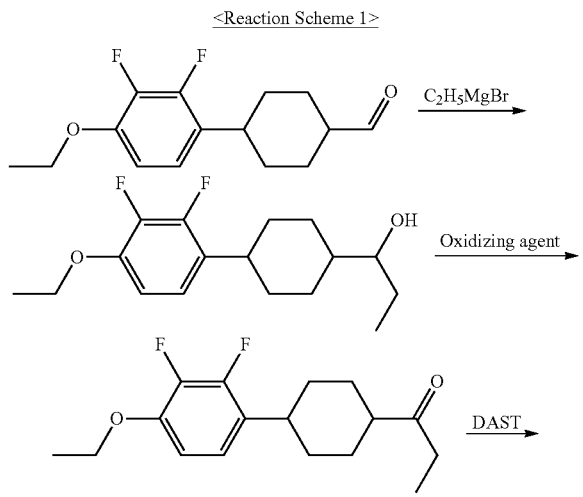

-continued

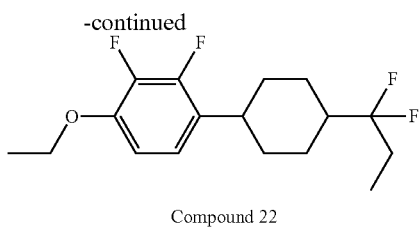

Compound 22

Compound 22 was found to have a purity of about 99.7% by gas chromatography (GC) and had a water content of about 215 ppm. As a result of phase transition temperature by differential scanning calorimetry (DSC), Compound 22 had a melting point of about 55.6° C., and appeared as white crystals at room temperature.

Fluorination in Reaction Scheme 1 may be performed with, for example, $SeF_4$, Deoxo-Fluor®, 1,1,2,2-tetrafluoroethyl-N,N-dimethylamine (TFEDMA), XtalFluor-E®, or XtalFluor-M®, instead of diethylaminosulfur trifluoride (DAST).

Evaluation Example 1

Dielectric anisotropy (Δ∈), operating temperature (Tni) and viscosity (η) values of Compounds 21, 22, and 102, and Compounds A and B were measured according to a method described in Table 3. The results are shown in Table 1.

TABLE 1

| Compound | Δ∈ | Tni | Viscosity (η) (mPa · s) |
|---|---|---|---|
| Compound 21 | −9.00 | −17.2 | 35.6 |
| Compound 22 | −8.43 | −14.7 | 30.5 |
| Compound 102 | −5.77 | −2.7 | 17.8 |
| Compound A | 0.45 | −25.3 | 58.3 |
| Compound B | 2.8 | −36.5 | 53 |

<Compound A>

<Compound B>

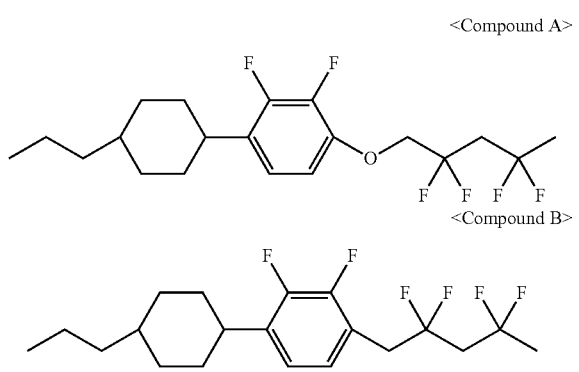

Referring to Table 1, Compounds 21 and 22 were found to have relatively small dielectric anisotropy (Δ∈) values, compared to Compound 102 and Compounds A and B. Dipole moments in Compounds A and B, may be generated due to fluorine substituted to the alkyl group in Compounds A and B, and were found to be at about 45° with respect to the major axis of each of Compounds A and B by using Mopac7. The difference in direction between the dipole moment generated due to fluorine substituted to the phenylene group of each of Compounds A and B and the dipole moment generated due to fluorine substituted to the alkyl group thereof may cause relatively small sums of the dipole moments in Compounds A and B and relatively small dielectric anisotropy absolute (|Δ∈|) values in Compounds A and B. In Compounds 21 and 22, due to the substitution of cyclohexylene with fluorine substituted alkyl group, the dipole moment generated due to fluorine substituted to the alkyl group was about 90° with respect to the major axis of Compounds 21 and 22, which may cause large sums of the dipole moments in Compounds 21 and 22 and large dielectric anisotropy absolute (|Δ∈|) values in Compounds 21 and 22.

Compounds 21 and 22 were also found to have smaller viscosities than Compounds A and B, because Compounds A and B include more substituted fluorines and have higher molecular weights due to an increased length of the fluorine substituted alkyl group.

Examples 1 to 8 and Comparative Examples 1 and 2

Preparation of Liquid Crystal Compositions

Liquid crystal compositions of Examples 1 to 8 and Comparative Examples 1 and 2 were prepared by mixing predetermined amounts of liquid crystal compounds as described in Table 2.

TABLE 2

| Example | Liquid crystal compound | Amount (wt %) |
|---|---|---|
| Example 1 | Compound 101 | 18 |
|  | Compound 102 | 18 |
|  | Compound 106 | 22 |
|  | Compound 108 | 22 |
|  | Compound 22 | 20 |
| Example 2 | Compound 102 | 18 |
|  | Compound 106 | 22 |
|  | Compound 108 | 22 |
|  | Compound 146 | 20 |
|  | Compound 18 | 18 |
| Example 3 | Compound 101 | 18 |
|  | Compound 102 | 18 |
|  | Compound 108 | 22 |
|  | Compound 146 | 22 |
|  | Compound 43 | 20 |
| Example 4 | Compound 143 | 12 |
|  | Compound 150 | 9 |
|  | Compound 219 | 10 |
|  | Compound 18 | 12 |
|  | Compound 21 | 13 |
|  | Compound 40 | 12 |
|  | Compound 43 | 13 |
| Example 5 | Compound 102 | 5 |
|  | Compound 106 | 12 |
|  | Compound 107 | 10 |
|  | Compound 108 | 12 |
|  | Compound 143 | 15 |
|  | Compound 144 | 11 |
|  | Compound 146 | 10 |
|  | Compound 150 | 10 |
|  | Compound 21 | 15 |
| Example 6 | Compound 120 | 20 |
|  | Compound 143 | 14 |
|  | Compound 144 | 10 |
|  | Compound 179 | 11 |
|  | Compound 191 | 10 |
|  | Compound 18 | 10 |
|  | Compound 40 | 10 |
|  | Compound 51 | 15 |
| Example 7 | Compound 143 | 15 |
|  | Compound 144 | 11 |
|  | Compound 150 | 10 |
|  | Compound 179 | 15 |
|  | Compound 18 | 14 |

TABLE 2-continued

| Example | Liquid crystal compound | Amount (wt %) |
|---|---|---|
| | Compound 21 | 13 |
| | Compound 40 | 11 |
| | Compound 43 | 11 |
| Example 8 | Compound 105 | 8 |
| | Compound 106 | 8 |
| | Compound 112 | 5 |
| | Compound 115 | 9 |
| | Compound 122 | 16 |
| | Compound 137 | 8 |
| | Compound 143 | 10 |
| | Compound 144 | 6 |
| | Compound 150 | 5 |
| | Compound 22 | 7 |
| | Compound 203 | 3 |
| | Compound 219 | 15 |
| Comparative Example 1 | Compound 101 | 18 |
| | Compound 102 | 18 |
| | Compound 106 | 22 |
| | Compound 108 | 22 |
| | Compound 146 | 20 |
| Comparative Example 2 | Compound 101 | 18 |
| | Compound 102 | 18 |
| | Compound 106 | 22 |
| | Compound 108 | 22 |
| | Compound A | 20 |

Evaluation Example 2

Each of the liquid crystal compositions of Examples 1 to 8 and Comparative Examples 1 and 2 was injected into a vertically aligned liquid crystal cell to evaluate the liquid crystal operating temperature Tni, the dielectric anisotropy value $\Delta\epsilon$, a refractive anisotropy value ($\Delta n$), the viscosity ($\eta$), and the VHR thereof according to the methods described in Table 3. The results are shown in Tables 4 and 5.

TABLE 3

| | |
|---|---|
| Tni | Tni was measured using a polarizing microscope equipped with a hot stage while a heating/cooling rate was maintained at about 2° C./min. |
| $\Delta\epsilon$ | A homeotropically aligned liquid crystal cell and a homogeneously aligned liquid crystal cell were manufactured using each of the liquid crystal compositions at 20° C. and 60 Hz by using a system (Model 6254, available from Toyo Co.) to determine $\epsilon \parallel$ (dielectric constant in a direction parallel to the symmetry axis) and $\epsilon \perp$ (dielectric constant in a direction perpendicular to the symmetry axis). $\Delta\epsilon$ was calculated using the equation ($\Delta\epsilon = \epsilon \parallel - \epsilon \perp$) |
| $\Delta n$ | Anisotropy in refractive index($\Delta n$) of liquid crystals to normal light and abnormal light were measured at 20° C. using an Abbe refractometer and an interference filter (589 nm) |
| $\eta$ | A viscosity ($\eta$) was measured at 25° C. using an E-type viscometer |
| VHR (60° C.) | A VHR was measured using a 1-inch vertically aligned (VA) test cell with a VA layer (available from JSR Corporation) on an ITO substrate by an area method at 60° C. with a holding time of about 16.6 msec. |
| VHR after UV irradiation (60° C.) | A VHR was measured after radiation of UV light (15 J) onto a 1-inch VA test cell with a VA layer (available from JSR Corporation) on an ITO substrate, by an area method at 60° C. with a holding time of about 16.6 msec. |

TABLE 4

| | Example 1 | Example 2 | Example 3 | Example 4 | Example 5 |
|---|---|---|---|---|---|
| Tni (° C.) | 62.6 | 76 | 76 | 78 | 82 |
| $\Delta\epsilon$ | -6.3 | -5.2 | -5.2 | -5.5 | -3.1 |
| $\Delta n$ | 0.098 | 0.086 | 0.087 | 0.083 | 0.075 |
| Viscosity $\eta$ (mPa · s) | 25 | 23 | 23 | 24 | 16 |
| VHR (%) | 98.8 | — | — | 98.8 | 98.7 |
| VHR after UV irradiation (15 J) | 97.5 | — | — | 97.4 | 97.6 |

TABLE 5

| | Example 6 | Example 7 | Example 8 | Comparative Example 1 | Comparative Example 2 |
|---|---|---|---|---|---|
| Tni (° C.) | 76 | 76 | 74 | 78 | 64 |
| $\Delta\epsilon$ | -3.9 | -3.9 | -3.2 | -4.8 | -4.7 |
| $\Delta n$ | 0.130 | 0.107 | 0.109 | 0.086 | 0.095 |
| Viscosity $\eta$ (mPa · s) | 19 | 15 | 17 | 23 | 28 |
| VHR (%) | 98.3 | 98.4 | 98.9 | 96.5 | 96.6 |
| VHR after UV irradiation (15 J) | 96.2 | 97.1 | 97.5 | 82.5 | 90.3 |

Referring to Tables 4 and 5, the liquid crystal compositions of Examples 1 to 8 were found to have higher reliability than the liquid crystal compositions of Comparative Examples 1 and 2.

Example 9

Compound 233 was added to the liquid crystal composition of Example 7 to be about 0.3 wt % of a final mixture composition, followed by UV irradiation to thereby manufacture a 55-inch PSVA mode TV having a pretilted angle of about 88°.

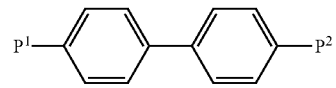

<Compound 233>

(wherein, in Compound 233, $P^1$ and $P^2$ are acrylate groups.)

Evaluation Example 3

A response rate of the liquid crystal composition of Example 9 was evaluated at an operating voltage of about 8V with a cell gap of about 3.1 μm. The response rate of the liquid crystal composition was determined by measuring a rising time ($T_{on}$) and a falling time ($T_{off}$). As a result, the liquid crystal composition of Example 9 was found to have a response rate ($T_{on}+T_{off}$) of about 12.5 ms, which was a higher response rate than the liquid crystal composition of Example 7.

Example 10

An 8-inch FFSmode TABLET panel was manufactured using the liquid crystal composition of Example 7. The panel had a cell gap of about 3.0 μm, pixels per inch of about 300 ppi, and a driving voltage of about 5.0V.

Evaluation Example 4

A VHR and afterimages of the panel of Example 9 (55-inch PSVA mode TV) were evaluated. The VHR measurement was performed using a VHR measurement system (available from Toyo Technica, Inc., at about 25 with a square wave voltage of about ±5V, a pulse interval of about 60 μseconds, and a frame time of about 16.7 seconds at 30 Hz per frame. The afterimage evaluation was performed by observing afterimages displayed on a display region after applying a checker flag on the display region at about 50° C. for about 168 hours.

As a result, the panel including the liquid crystal composition of Example 9, was found to have an improved VHR and exhibit less afterimages.

As described above, according to one or more of the above exemplary embodiments of the present invention, the liquid crystal composition including one or more of the liquid crystal compound of Formula 1 may have relatively low viscosity, suitable refractive anisotropy, a negative dielectric anisotropy, and may be stable against UV light or heat. The liquid crystal display including one or more of the liquid crystal compositions may have an improved VHR and exhibit less afterimages.

While the present invention has been shown and described with reference to the exemplary embodiments thereof, it will be apparent to those of ordinary skill in the art that various changes in form and detail may be made thereto without departing from the spirit and scope of the present invention as defined by the following claims.

What is claimed is:
1. A liquid crystal compound represented by Formula 1:

<Formula 1>

$$R_{11}-CF_2-(CH_2)_{n11}-\left(A_{11}\right)-L_{11}-\left[\left(A_{12}\right)-L_{12}\right]_{m11}$$

$$-\left[\left(A_{13}\right)-L_{13}\right]_{m12}-\left(\underset{F}{\overset{F}{\bigcirc}}\right)-\left[L_{14}-\left(A_{14}\right)\right]_{m13}-R_{12},$$

wherein $\left(A_{11}\right)$ is a group represented by Formula 10-1;

$\left(A_{12}\right)$, $\left(A_{13}\right)$, and $\left(A_{14}\right)$ are each independently selected from groups represented by Formulae 10-1 to 10-12:

$L_{11}$, $L_{12}$, $L_{13}$, and $L_{14}$ are each independently selected from a single bond, —CH$_2$CH$_2$—, —CH$_2$O—, —OCH$_2$—, —CF$_2$O—, and —OCF$_2$—;

m11, m12, and m13 are each independently selected from 0 and 1;

n11 is selected from 0, 1, 2, 3, and 4;

$R_{11}$ is selected from hydrogen and a C$_1$-C$_7$ alkyl group; and $R_{12}$ is selected from hydrogen, —F, a C$_1$-C$_5$ alkyl group, a C$_1$-C$_5$ alkoxy group, a C$_2$-C$_5$ alkenyl group, a C$_1$-C$_5$ alkyl group substituted with —F, a C$_1$-C$_5$ alkoxy group substituted with —F, and—a C$_2$-C$_5$ alkenyl group substituted with —F.

2. The liquid crystal compound of claim 1, wherein

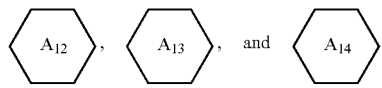

are each independently selected from groups represented by Formulae 10-1 to 10-7, Formula 10-9, and Formula 10-12:

10-1

10-2
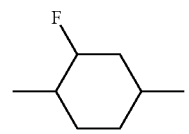

10-3
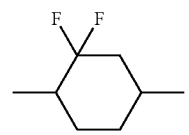

10-4
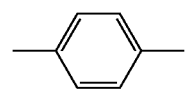

10-5
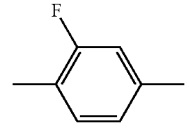

10-6
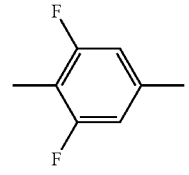

10-7
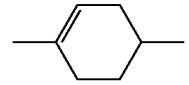

10-9
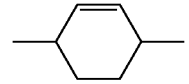

-continued 10-12
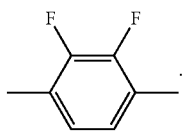

3. The liquid crystal compound of claim 1, wherein

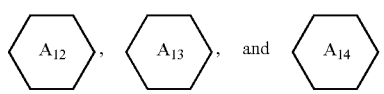

are each independently selected from groups represented by Formulae 10-1 to 10-6, and Formula 10-12:

10-1
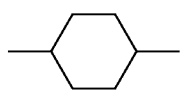

10-2
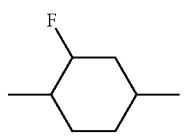

10-3
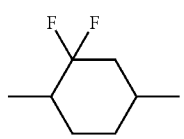

10-4
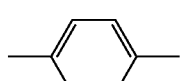

10-5
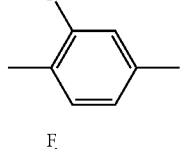

10-6

10-12
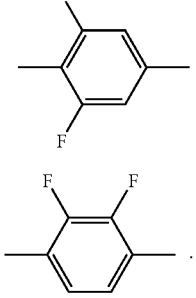

4. The liquid crystal compound of claim 1, wherein

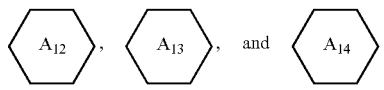

are each independently selected from groups represented by Formulae 10-1 and 10-4:

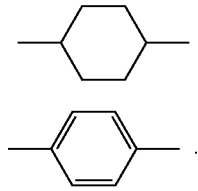

10-1

10-4

5. The liquid crystal compound of claim 1, wherein $R_{11}$ is selected from hydrogen, a methyl group, an ethyl group, and an n-propyl group.

6. The liquid crystal compound of claim 1, wherein $R_{12}$ is selected from
hydrogen, a methyl group, an ethyl group, an n-propyl group, an n-butyl group, an n-pentyl group, an n-hexyl group, a methoxy group, an ethoxy group, an n-propoxy group, an n-butoxy group, an n-pentoxy group, an ethenyl group, a 1-propenyl group, a 2-propenyl group, a 1-butenyl group, a 2-butenyl group, a 1-pentenyl group, a 2-pentenyl group, and
a methyl group, an ethyl group, an n-propyl group, an n-butyl group, an n-pentyl group, and an n-hexyl group, each substituted with —F.

7. The liquid crystal compound of claim 1, wherein the liquid crystal compound is represented by one of Formulae 1-1 to 1-3:

<Formula 1-1>

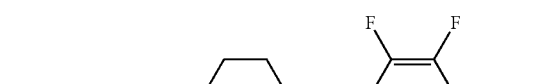

<Formula 1-2>

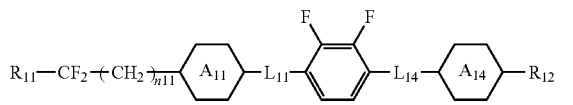

<Formula 1-3>

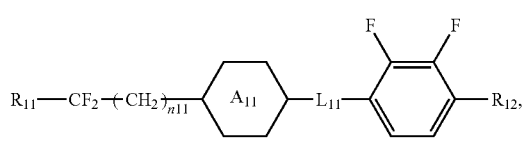

wherein, in Formulae 1-1 to 1-3,

$L_{11}$, $L_{14}$, n11, $R_{11}$, and $R_{12}$ are as defined in Formula 1.

8. The liquid crystal compound of claim 1, wherein the liquid crystal compound is one of Compounds 11 to 56, 67 to 79, and 83 to 94:

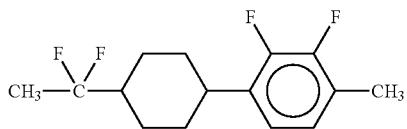
(11)

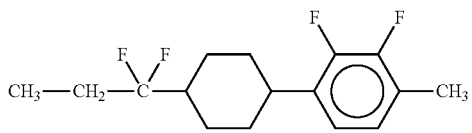
(12)

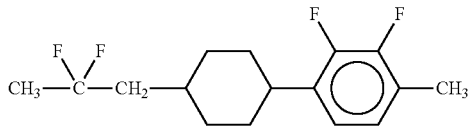
(13)

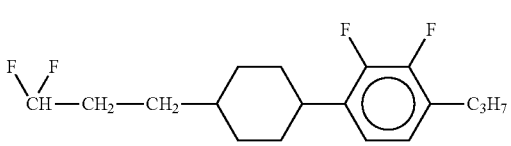
(14)

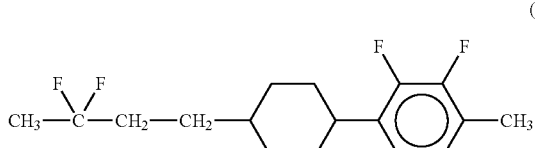
(15)

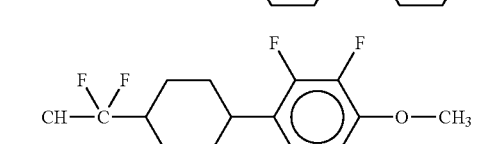
(16)

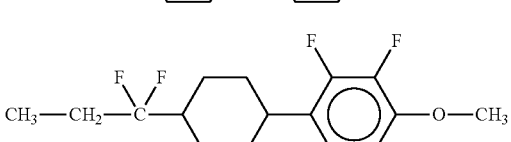
(17)

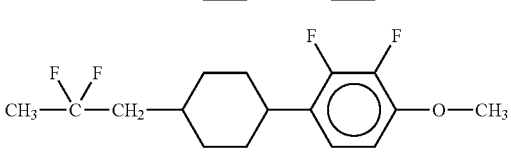
(18)

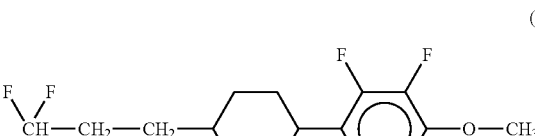
(19)

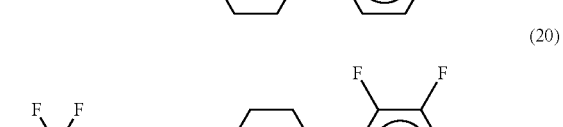
(20)

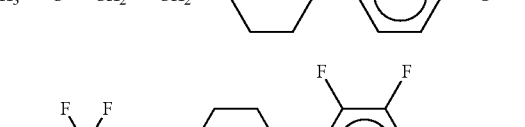
(21)

-continued
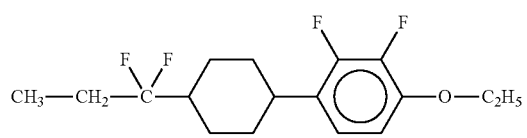 (22)
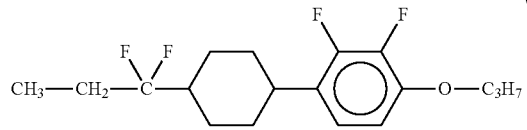 (23)
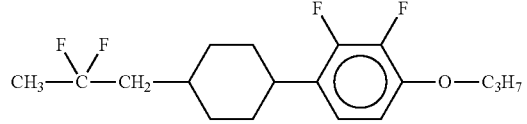 (24)
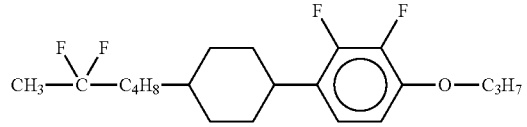 (25)
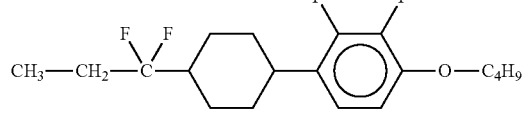 (26)
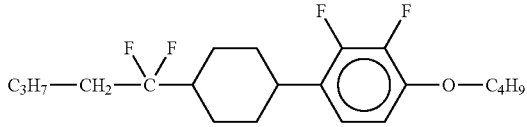 (27)
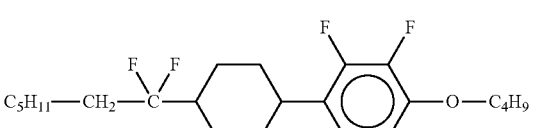 (28)
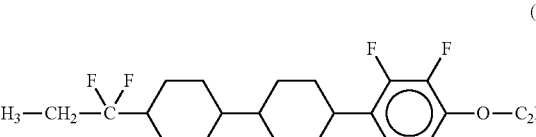 (29)
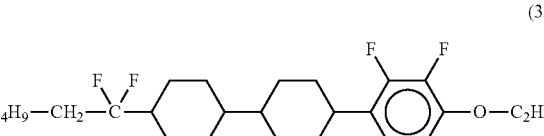 (30)
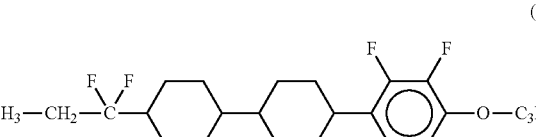 (31)
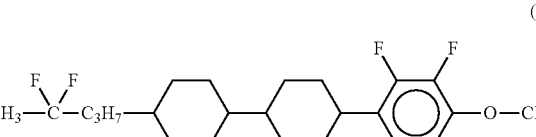 (32)
-continued
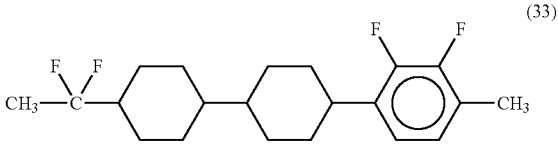 (33)
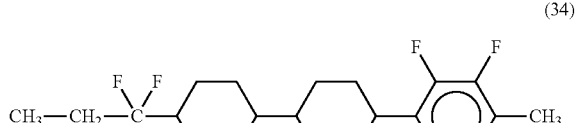 (34)
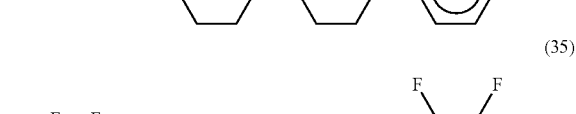 (35)
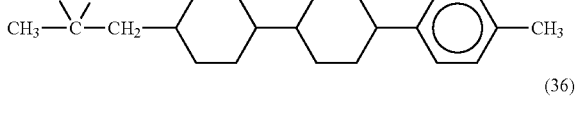 (36)
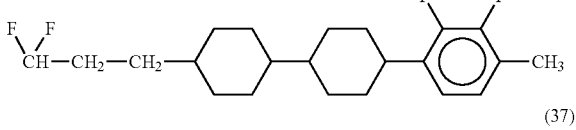 (37)
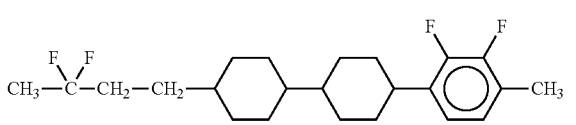 (38)
 (39)
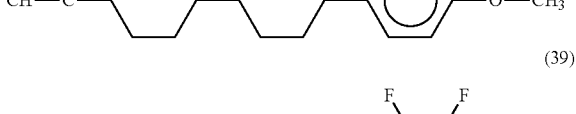 (40)
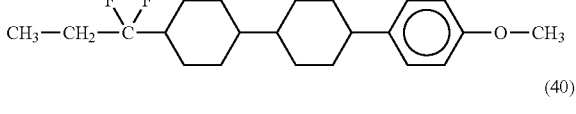 (41)
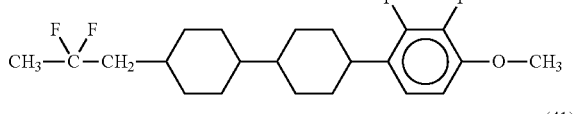 (42)
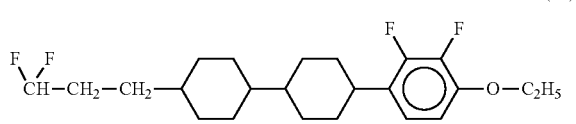 (43)

-continued

(44) (55) (45) (56) (46) (67) (47) (68) (48) (69) (49) (70) (50) (71) (51) (72) (52) (73) (53) (74) (54) (75)

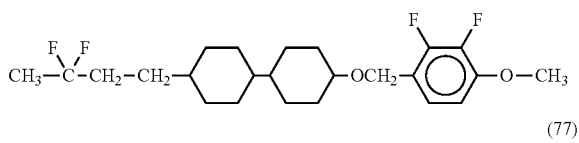

(76)

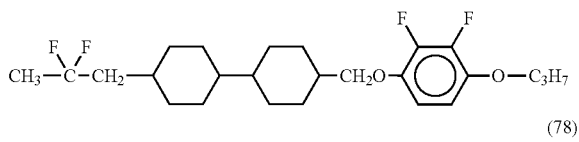

(77)

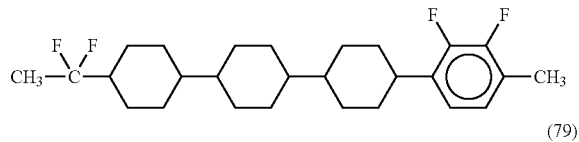

(78)

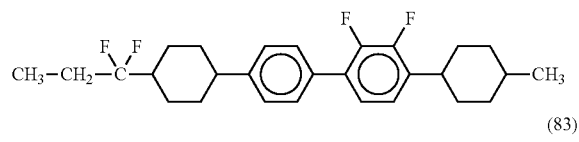

(79)

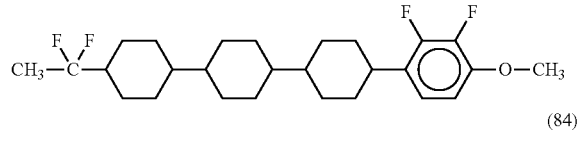

(83)

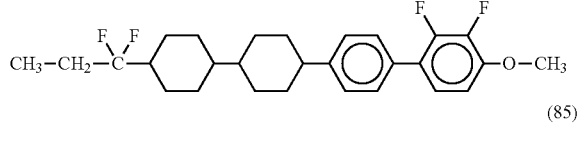

(84)

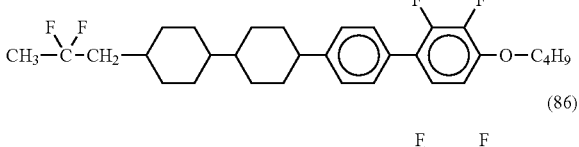

(85)

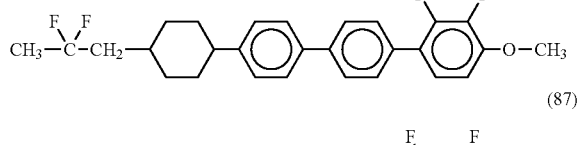

(86)

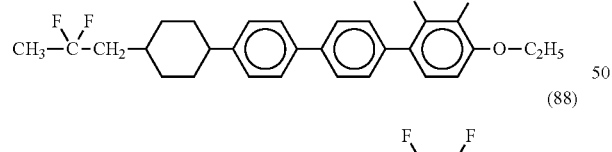

(87)

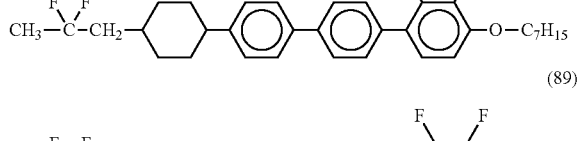

(88)

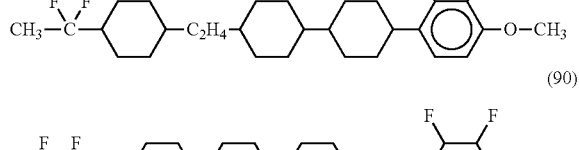

(89)

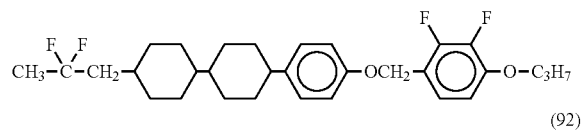

(90)

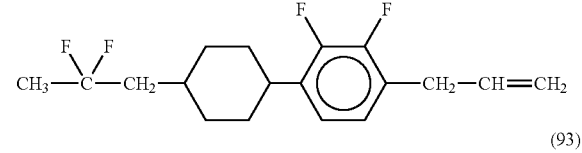

(91)

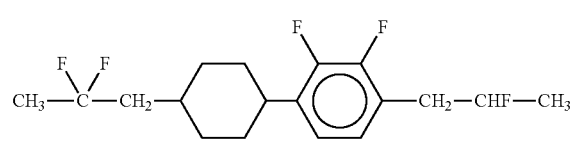

(92)

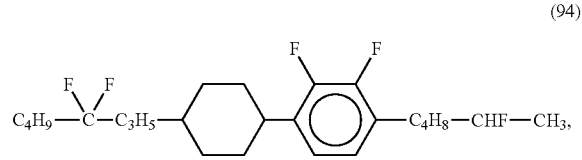

(93)

(94)

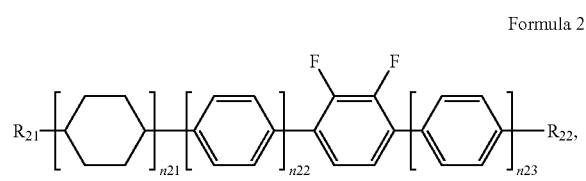

wherein, in Compounds 11 to 56, 67 to 79, and 83 to 94, $C_3H_7$ is an n-propyl group, and $C_4H_9$ is an n-butyl group.

9. A liquid crystal composition comprising the liquid crystal compound of claim 1.

10. The liquid crystal composition of claim 9, wherein the amount of the liquid crystal compound is in a range of about 0.1 wt % to about 80 wt %.

11. The liquid crystal composition of claim 9, further comprising a second liquid crystal compound represented by Formula 2:

Formula 2

$$R_{21}\!\!-\!\!\left[\bigcirc\right]_{n21}\!\!-\!\!\left[\bigcirc\right]_{n22}\!\!-\!\!\left[\bigcirc\right]\!\!-\!\!\left[\bigcirc\right]_{n23}\!\!-\!\!R_{22},$$

wherein $R_{21}$ and $R_{22}$ are each independently selected from a $C_1$-$C_7$ alkyl group, a $C_1$-$C_7$ alkoxy group, and a $C_2$-$C_7$ alkenyl group;

n21, n22, and n23 are each independently selected from 0, 1, 2, and 3; and a sum of n21, n22, and n23 is selected from 1, 2, and 3.

12. The liquid crystal composition of claim 11, wherein the second liquid crystal compound is one of Compounds 100 to 142:

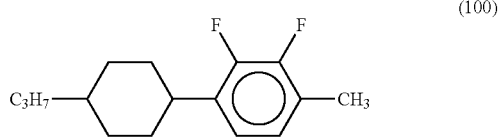

(100)

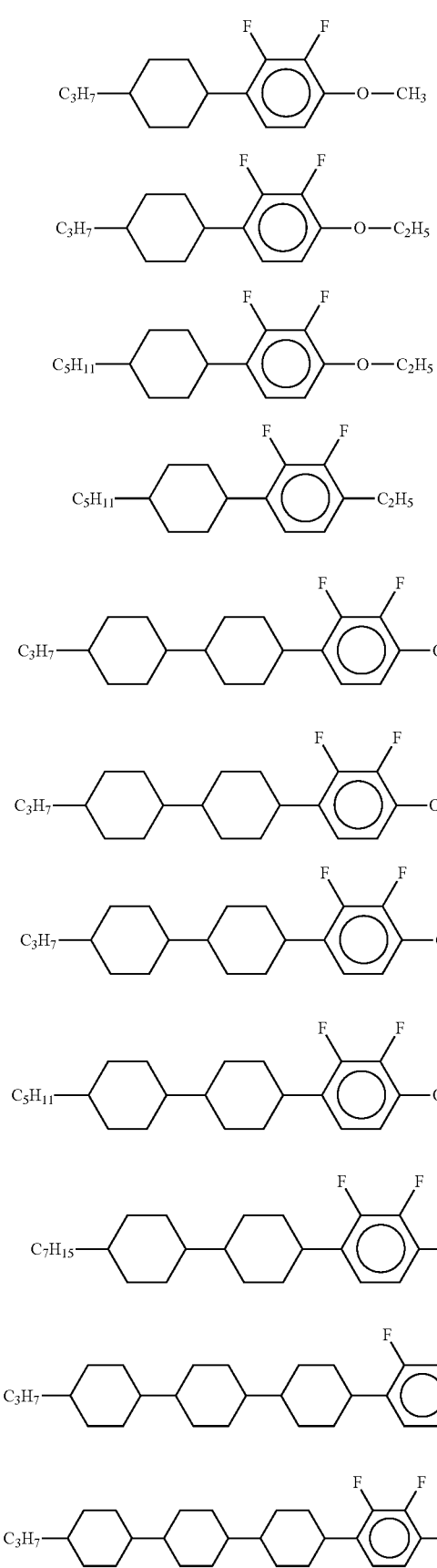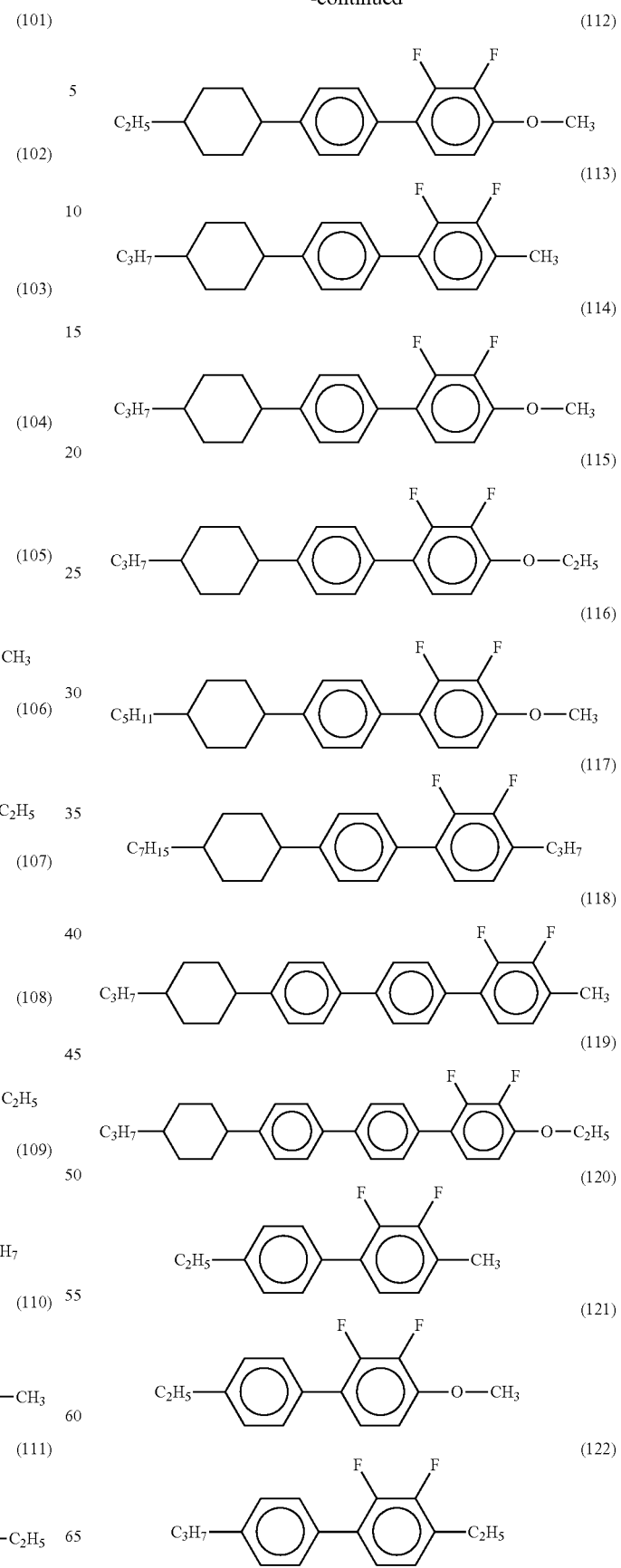

wherein, in Compounds 100 to 142, C₃H₇ is an n-propyl group, C₅H₁₁ is an n-pentyl group, and C₇H₁₅ is an n-heptyl group.

13. The liquid crystal composition of claim 9, further comprising a third liquid crystal compound represented by Formula 3:

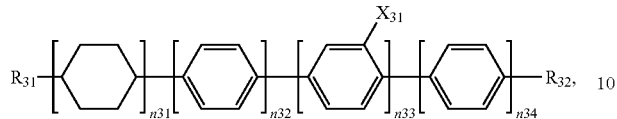

Formula 3 wherein $R_{31}$ and $R_{32}$ are each independently selected from a $C_1$-$C_7$ alkyl group, a $C_1$-$C_7$ alkoxy group, and a $C_2$-$C_7$ alkenyl group;

$X_{31}$ is selected from hydrogen and —F;

n31, n32, n33, and n34 are each independently selected from 0, 1, 2, and 3; and a sum of n31, n32, n33, and n34 is selected from 2, 3, and 4.

14. The liquid crystal composition of claim 13, wherein the third liquid crystal compound is one of Compounds 143 to 184:

(143)
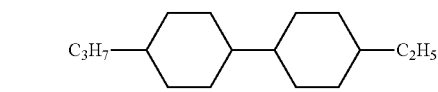

(144)
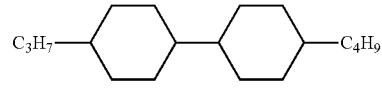

(145)
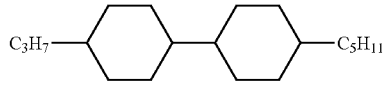

(146)
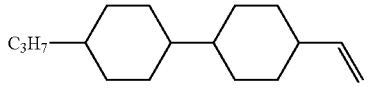

(147)
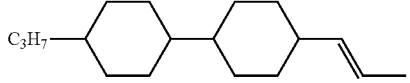

(148)
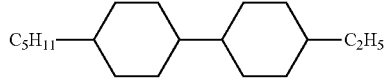

(149)
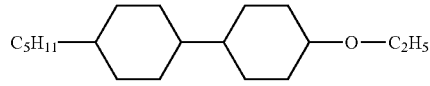

(150)
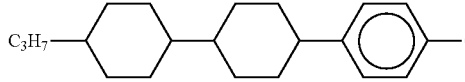

(151)
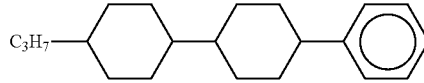

(152)
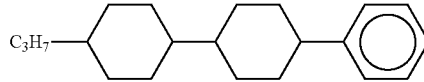

-continued (153)
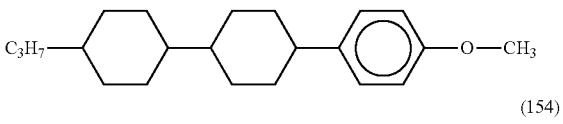

(154)
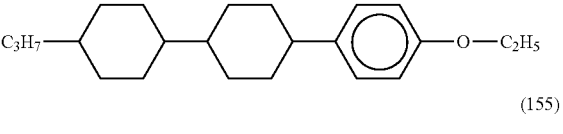

(155)
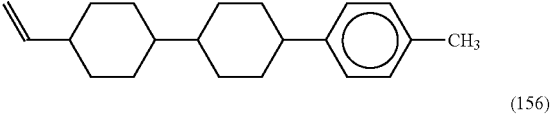

(156)
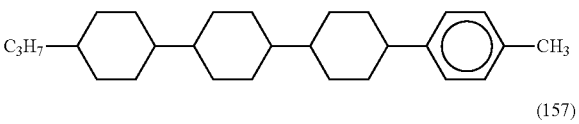

(157)
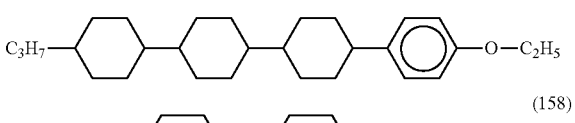

(158)
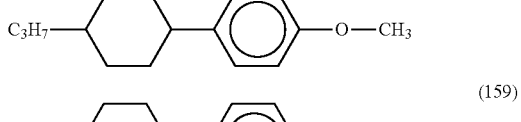

(159)
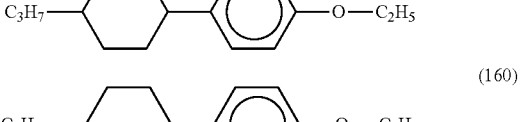

(160)

(161)
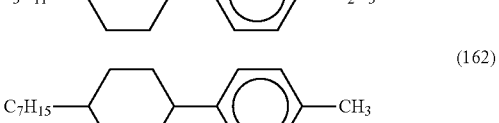

(162)
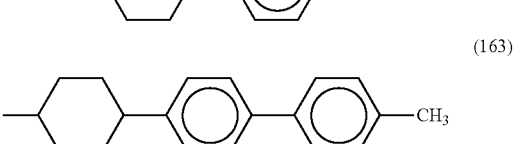

(163)

(164)

(165)
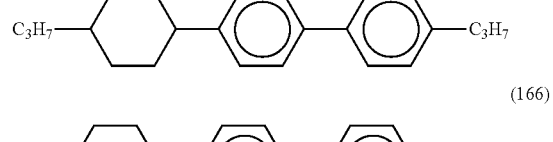

(166)
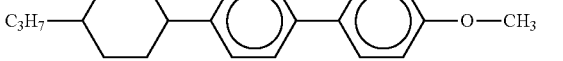

(167) [Structure: C₃H₇—cyclohexyl—phenyl—phenyl—O—C₂H₅]

(168) [Structure: CH₂=CH—cyclohexyl—phenyl—phenyl—CH₃]

(169) [Structure: C₃H₇—cyclohexyl—phenyl—phenyl(F)—phenyl—CH₃]

(170) [Structure: C₃H₇—cyclohexyl—phenyl—phenyl(F)—phenyl—O—C₂H₅]

(171) [Structure: C₂H₅—phenyl—phenyl—CH₃]

(172) [Structure: C₂H₅—phenyl—phenyl—O—CH₃]

(173) [Structure: C₃H₇—phenyl—phenyl—C₂H₅]

(174) [Structure: C₃H₇—phenyl—phenyl—O—C₂H₅]

(175) [Structure: C₅H₁₁—phenyl(F)—phenyl—O—C₂H₅]

(176) [Structure: C₅H₁₁—phenyl(F)—phenyl—C₂H₅]

(177) [Structure: C₃H₇—phenyl—phenyl—phenyl—CH₃]

(178) [Structure: C₂H₅—phenyl—phenyl—phenyl—O—CH₃]

(179) [Structure: C₃H₇—phenyl—phenyl(F)—phenyl—CH₃]

(180) [Structure: C₃H₇—phenyl—phenyl(F)—phenyl—C₂H₅]

(181) [Structure: C₅H₁₁—phenyl—phenyl(F)—phenyl—O—CH₃]

(182) [Structure: C₇H₁₅—phenyl—phenyl—phenyl—C₃H₇]

(183) [Structure: C₃H₇—phenyl—phenyl—phenyl(F)—phenyl—CH₃]

(184) [Structure: C₃H₇—phenyl—phenyl—phenyl(F)—phenyl—O—C₂H₅], wherein, in Compounds 143 to 184, $C_3H_7$ is an n-propyl group, $C_5H_{11}$ is an n-pentyl group, and $C_7H_{15}$ is an n-heptyl group.

15. The liquid crystal composition of claim 9, further comprising a fourth liquid crystal compound represented by Formula 4:

<Formula 4>

$$R_{41}\text{---}\left[A_{41}\right]_{n41}\text{---}(L_{41})_{n42}\text{---}\left[A_{42}\right]_{n43}\text{---}(L_{42})_{n44}\text{---}\underset{F\ F}{\text{phenyl}}\text{---}R_{42},$$

wherein $A_{41}$ and $A_{42}$ are each independently selected from groups represented by Formulae 10-1 to 10-11;

10-1 [cyclohexyl]

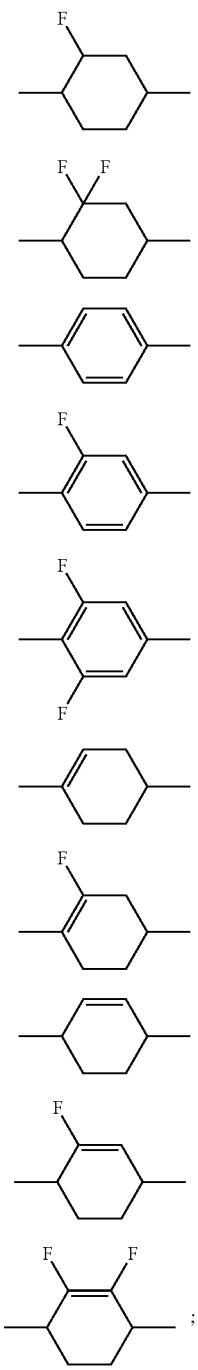

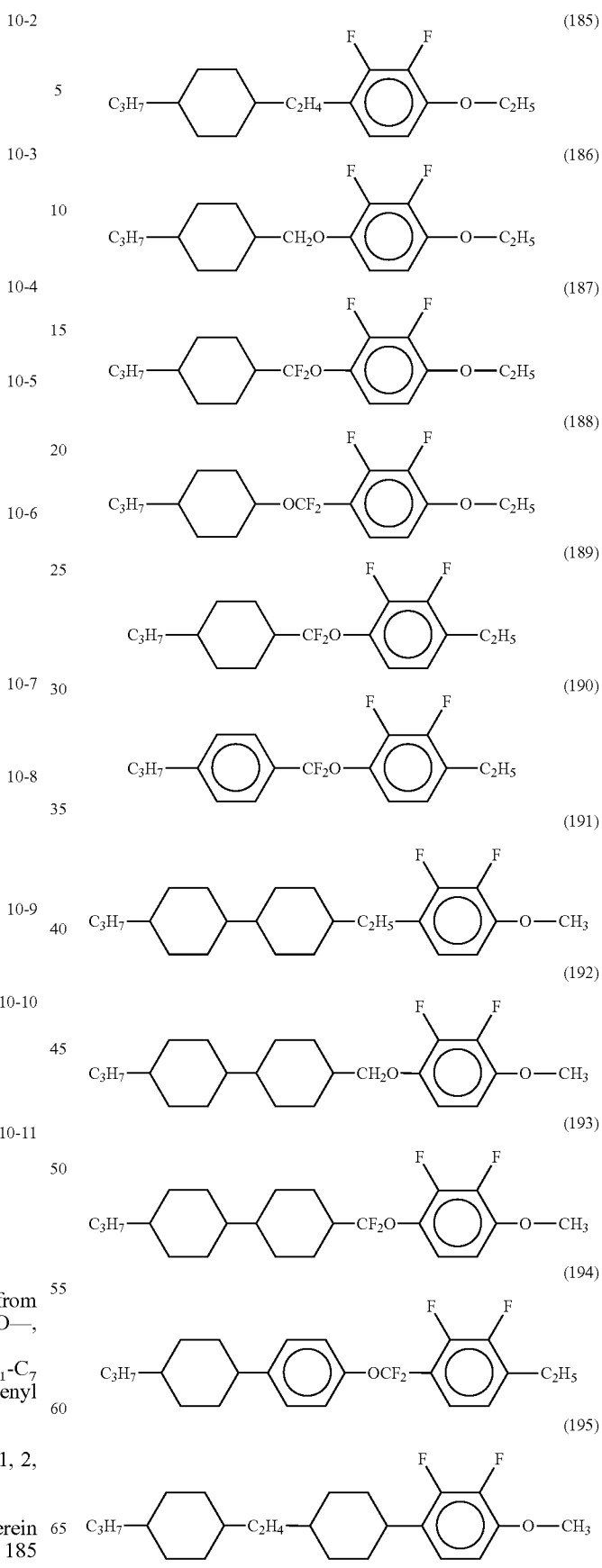

$L_{41}$ and $L_{42}$ are each independently selected from —CH$_2$CH$_2$—, —CH$_2$O—, —OCH$_2$—, —CF$_2$O—, and —OCF$_2$—;

$R_{41}$ and $R_{42}$ are each independently selected from a $C_1$-$C_7$ alkyl group, a $C_1$-$C_7$ alkoxy group, and a $C_2$-$C_7$ alkenyl group;

n41 is selected from 1, 2, and 3;

n42 to n44 are each independently selected from 0, 1, 2, and 3; and a sum of n42 and n44 is selected from 1 and 2.

16. The liquid crystal composition of claim 15, wherein the fourth liquid crystal compound is one of Compounds 185 to 199:

-continued

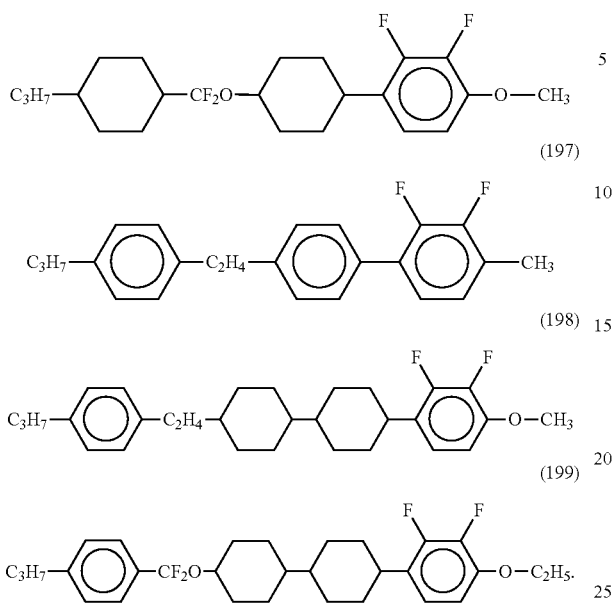

17. The liquid crystal composition of claim 9, further comprising a fifth liquid crystal compound represented by Formula 5:

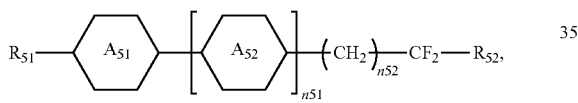

wherein

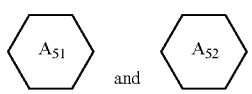

are each independently selected from groups represented by Formulae 10-1 to 10-11;

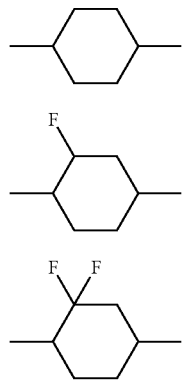

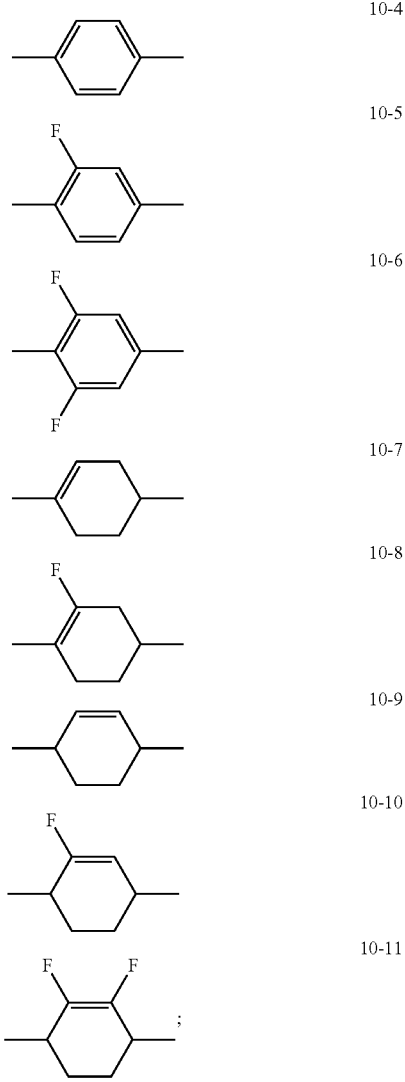

n51 is selected from 1, 2, and 3;

n52 is selected from 0, 1, 2, 3, and 4;

$R_{51}$ is selected from hydrogen, a $C_1$-$C_5$ alkyl group, a $C_1$-$C_5$ alkoxy group, a $C_2$-$C_5$ alkenyl group, a $C_1$-$C_5$ alkyl group substituted with —F, a $C_1$-$C_5$ alkoxy group substituted with —F, and a $C_2$-$C_5$ alkenyl group substituted with —F; and $R_{52}$ is selected from hydrogen and a $C_1$-$C_5$ alkyl group.

18. The liquid crystal composition of claim 17, wherein the fifth liquid crystal compound is one of Compounds 200 to 224:

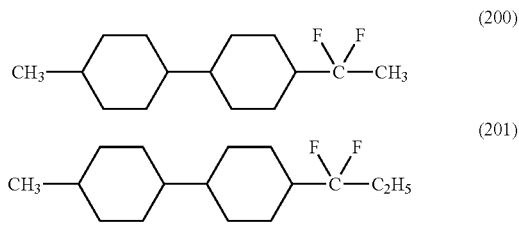

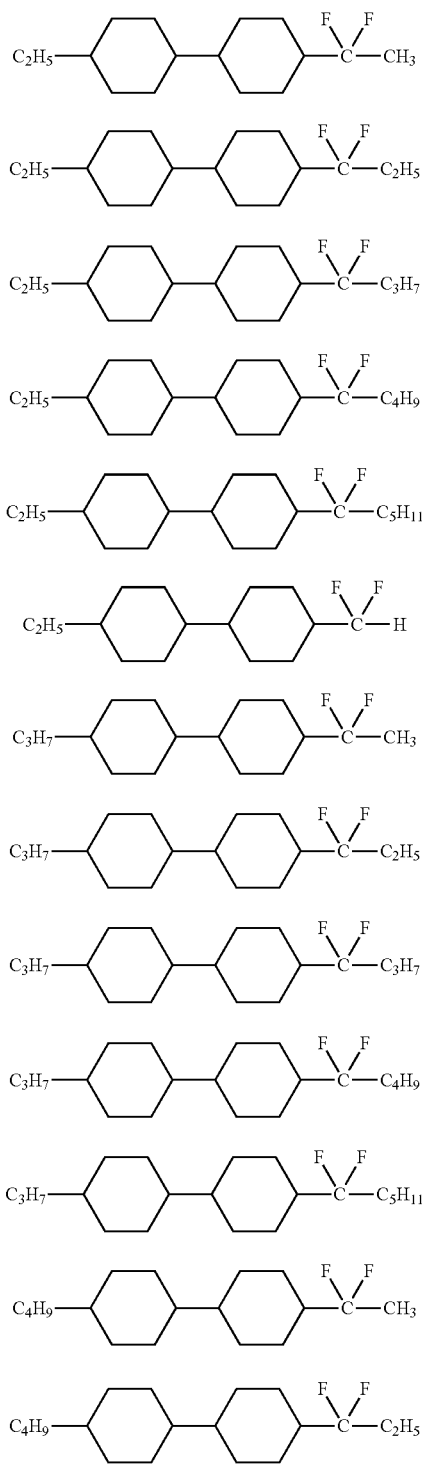
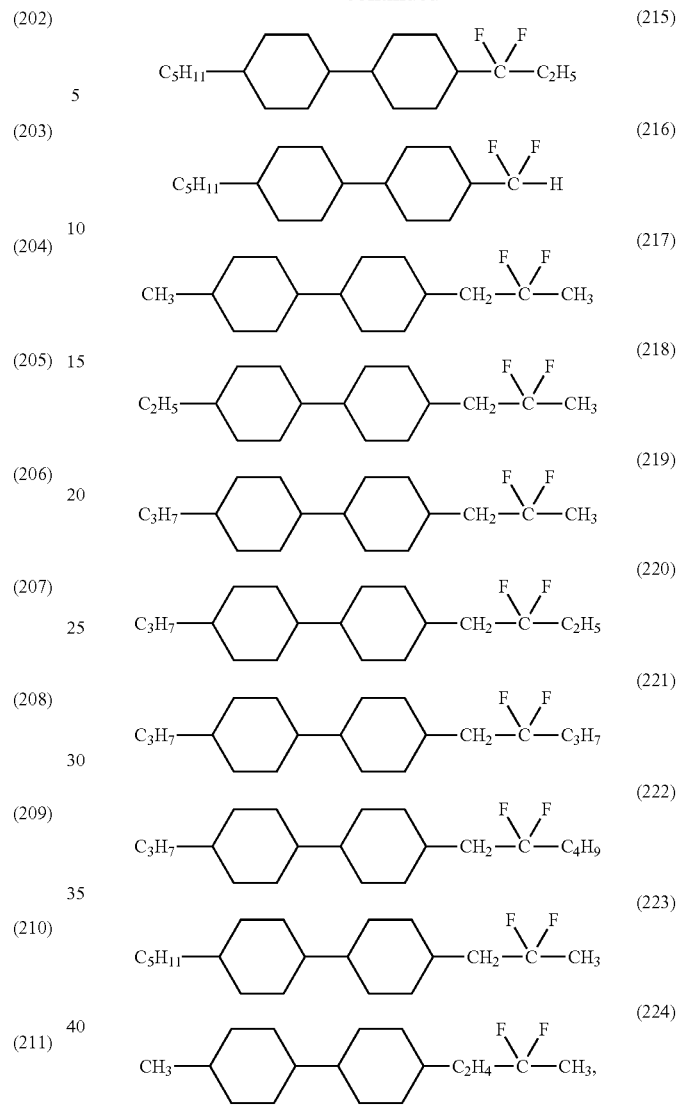

wherein, in Compounds 200 to 224, $C_3H_7$ is an n-propyl group, $C_4H_9$ is an n-butyl group, and $C_5H_{11}$ is an n-pentyl group.

19. The liquid crystal composition of claim 9, further comprising at least one selected from a chiral agent, a polymerizable additive, and a stabilizing agent.

20. A liquid crystal display comprising:
a first electrode;
a second electrode; and
a liquid crystal layer disposed between the first electrode and the second electrode, wherein the liquid crystal layer comprises the liquid crystal composition of claim 9.

* * * * *